United States Patent [19]
Jones

[11] Patent Number: 5,954,384
[45] Date of Patent: Sep. 21, 1999

[54] WINDSHIELD PROTECTION GUARD AND COMBINATION SUPPORT SURFACE ASSEMBLY

[76] Inventor: Charles M. Jones, 658 Parksferry Rd., Friendsville, Tenn. 37737

[21] Appl. No.: 09/031,409

[22] Filed: Feb. 26, 1998

[51] Int. Cl.⁶ ........................................................ B60J 1/20
[52] U.S. Cl. .............................. 296/95.1; 296/96; 280/748
[58] Field of Search ....................... 296/95.1, 96; 280/748

[56] References Cited

U.S. PATENT DOCUMENTS

| | | | |
|---|---|---|---|
| 1,180,124 | 4/1916 | Foedisch | 296/96 |
| 1,287,162 | 12/1918 | Weed | 296/95.1 |
| 1,289,944 | 12/1918 | Snyder | 296/95.1 |
| 1,348,135 | 7/1920 | Damon | 296/95.1 |
| 1,368,986 | 2/1921 | Sumner | 296/95.1 |
| 1,461,478 | 6/1923 | Daniels | 296/95.1 |
| 1,462,127 | 7/1923 | Sanders | 296/95.1 |
| 3,049,373 | 8/1962 | Biggers | 280/748 |
| 4,903,748 | 2/1990 | Foraker | 296/95.1 |

FOREIGN PATENT DOCUMENTS

| | | | |
|---|---|---|---|
| 0620284 | 4/1927 | France | 296/95.1 |
| 1216983 | 4/1960 | France | 296/95.1 |
| 0259925 | 12/1926 | United Kingdom | 296/95.1 |
| 2213780 | 8/1989 | United Kingdom | 280/748 |

Primary Examiner—Joseph D. Pape
Assistant Examiner—Kiran Patel
Attorney, Agent, or Firm—M. Alex Brown

[57] ABSTRACT

A protective windshield guard and combination support surface assembly is disclosed, for use in many diverse applications, including use in combination with a vehicle or device having at least first, second, and third support areas adjacent to a windshield or other surface needing cover and/or protection. The invention is used, when installed in relation to these support areas, in a first position adjoining the first support area for protection of the windshield or surface; and is used in at least a second position, adjoining the third area as a covering, adjoining support over this area. The invention is provided with a mesh attached to a support frame having extension parts positioned outboard of the mesh; and at least one hinge support. At least one coupling or articulator attached to the support frame and corresponding mate attached to the first area; and at least another coupling on the frame with corresponding mate attached to the third area. The frame can, therefore, be pivoted or moved, and secured, to the first position, using the coupling on the frame and the corresponding mate on the first area. And the frame can be moved and secured to the second position using the other coupling on the frame and corresponding mate on the third area. When the support frame is moved to the first position it can be utilized to protect and cover the windshield or surface; and when moved to the second position, it is used to cover at least part of the third area and provide a functioning support area over the third area.

20 Claims, 19 Drawing Sheets

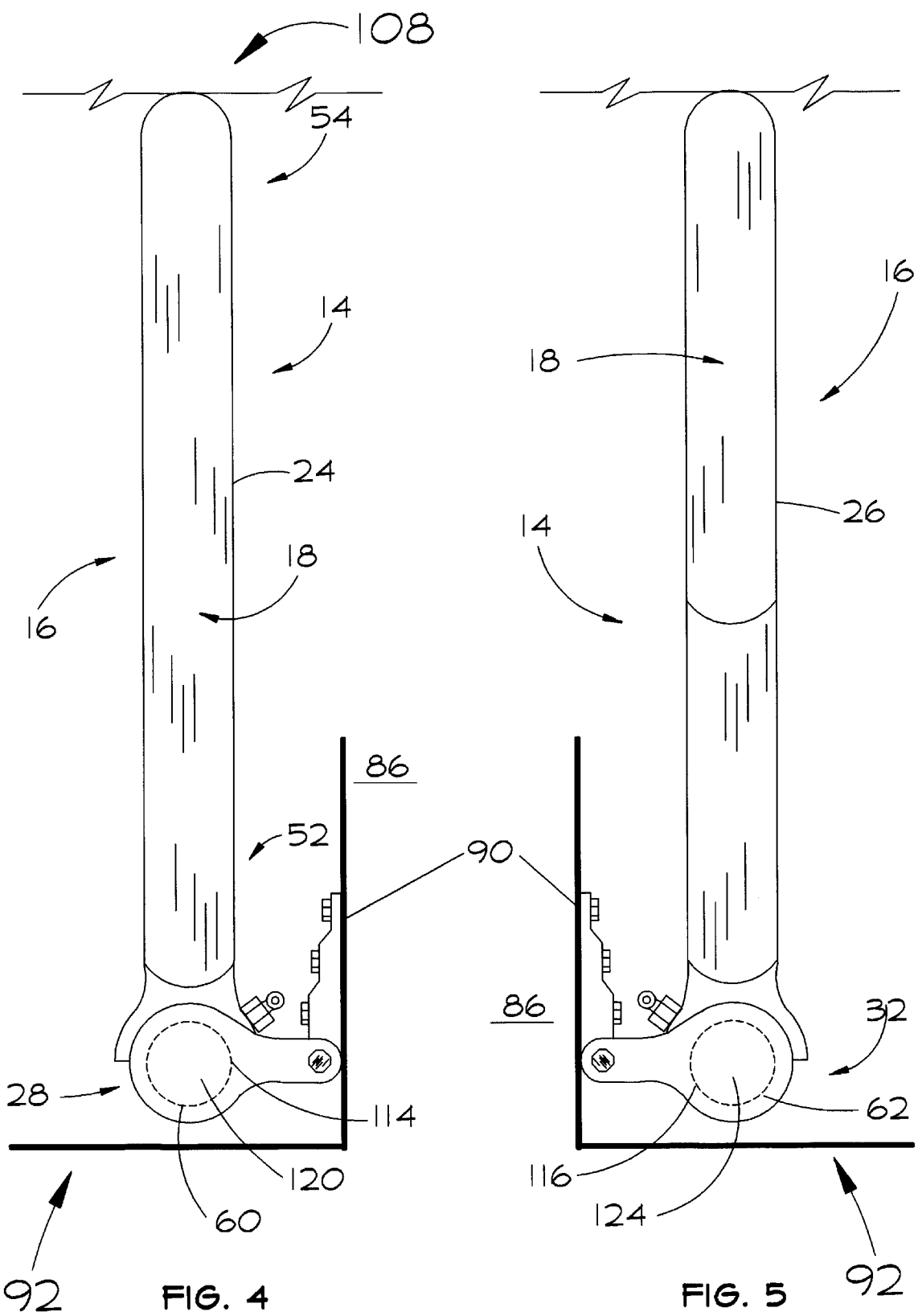

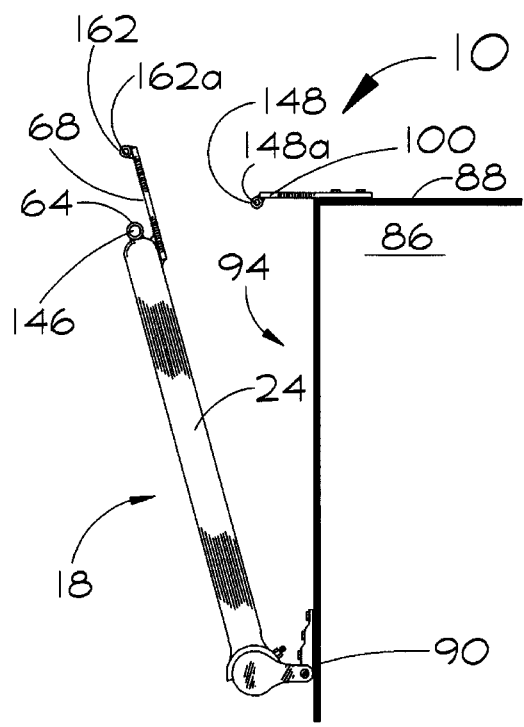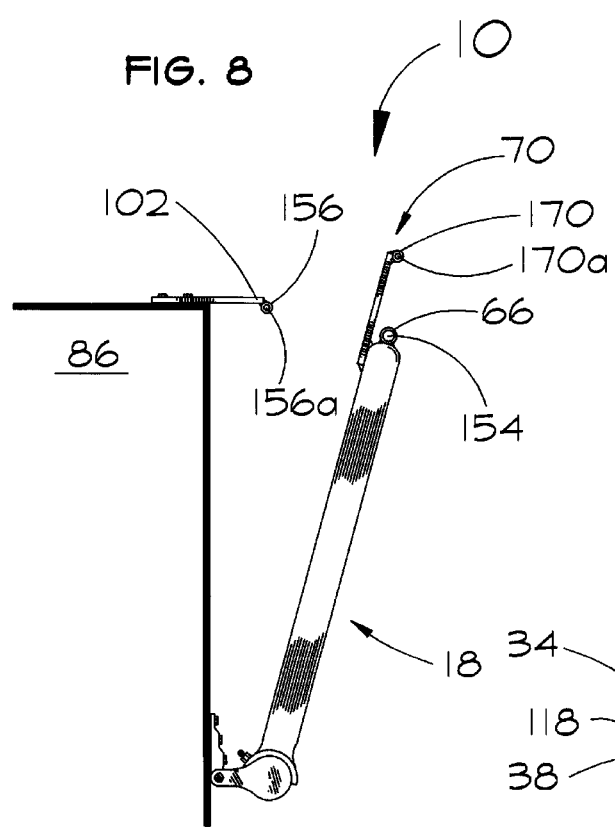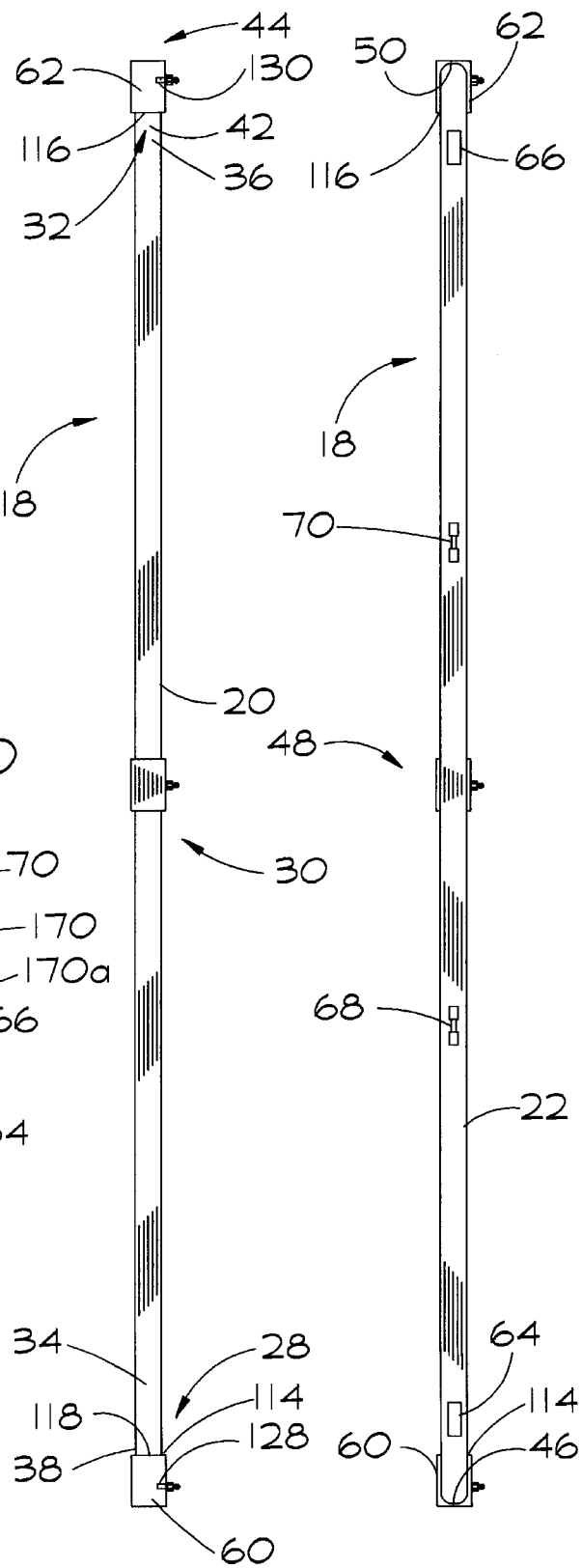
FIG. 8    FIG. 11    FIG. 10    FIG. 9

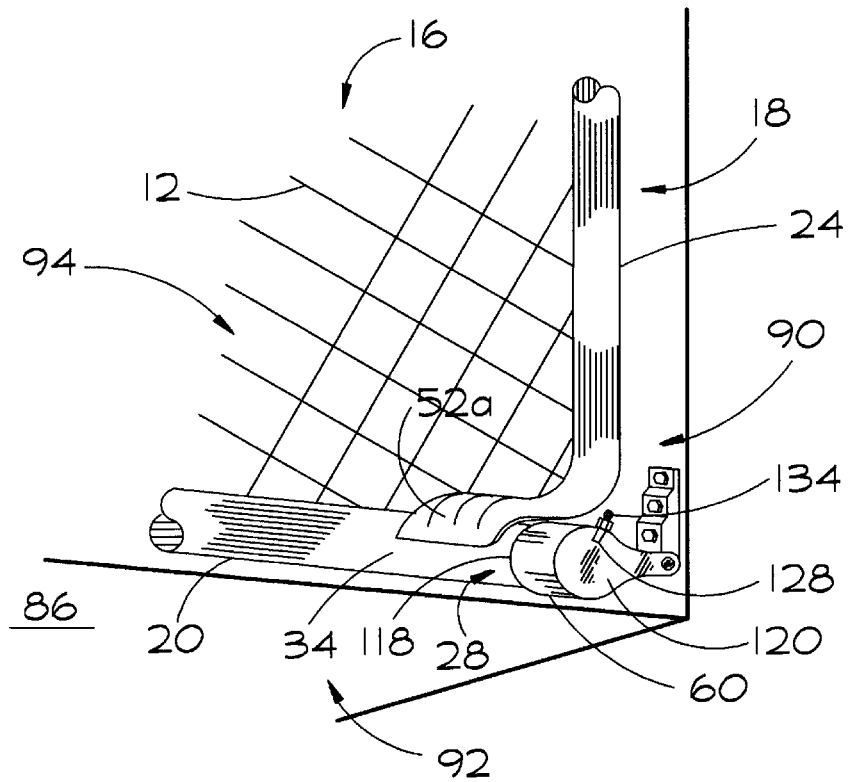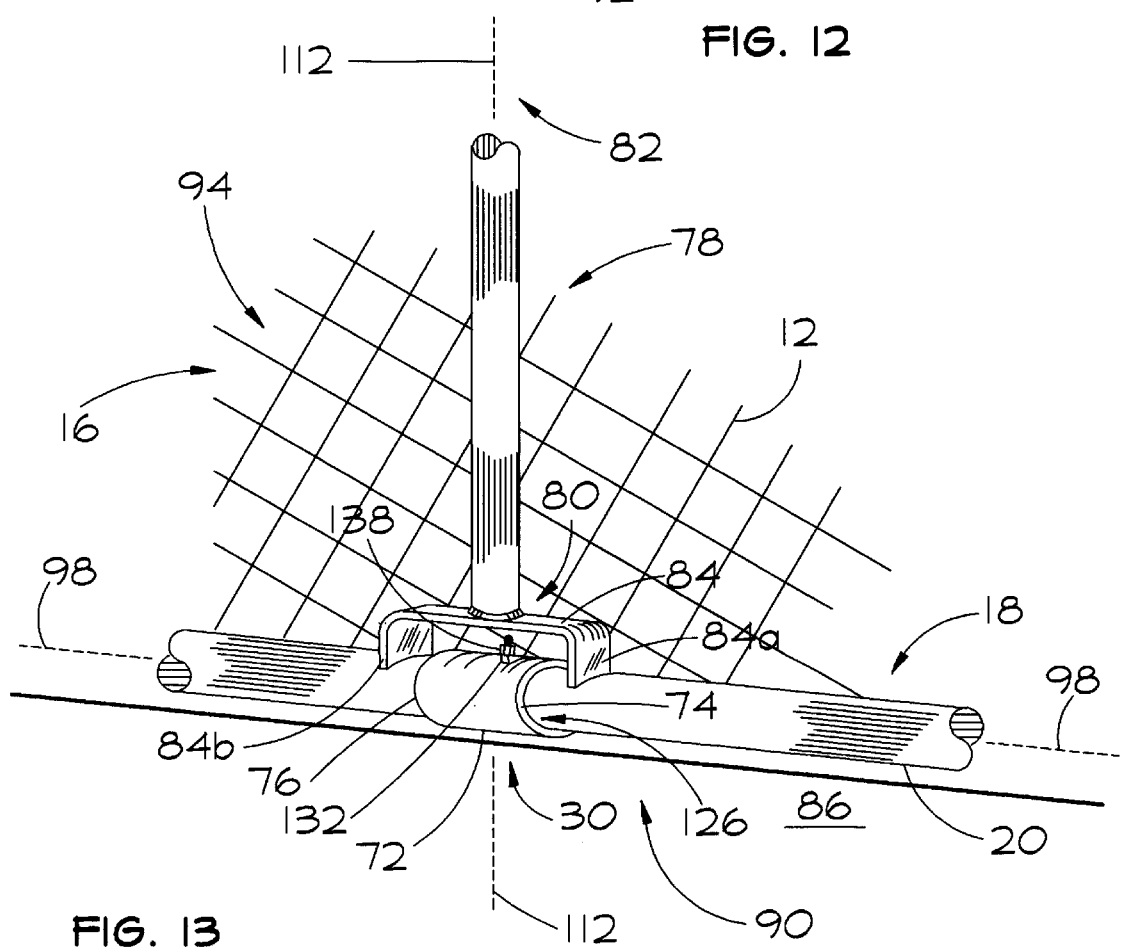

WINDSHIELD PROTECTION GUARD AND COMBINATION SUPPORT SURFACE ASSEMBLY

BACKGROUND OF THE INVENTION

1. Field Of The Invention

The invention relates to a windshield protective device and combination support surface which can be pivoted to a plurality of positions and secured at each position to provide protection to the windshield of a vehicle in at least one position, and provide protection to, and act as a support surface over, another part of the vehicle.

2. BACKGROUND INFORMATION

Typical of the prior art references related to a windshield protection guard of those types found are United States patent Numbers to: Trethewey, U.S. Pat. No. 5,441,095; Bock et al., U.S. Pat. No. 5,415,214; Palmer II et al., U.S. Pat. No. 5,356,193; Sheehan, U.S. Pat. No. 5,356,191; Berry, U.S. Pat. No. 5,332,278; Desmond et al., U.S. Pat. No. 5,307,725; Martinez, U.S. Pat. No. 4,768,823; Weatherspoon, U.S. Pat. No. 4,726,406; Monteath et al., U.S. Pat. No. 4,442,881; Logue, U.S. Pat. No. 3,833,255; Thompson, U.S. Pat. No. 3,410,601; Compson, U.S. Pat. No. 2,944,601; Moore, U.S. Pat. No. 2,723,714; Pace, U.S. Pat. No. 1,825,538; and Fahrney, U.S. Pat. No. 1,316,834; each of which was located during the course of a patent search.

Bock et al. '214 shows a cover device for a motor vehicle window and/or lights, disclosing an external shell having two handles connected to the shell at a perimeter region of its two ends. The end regions of the shell are closed inside a motor vehicle passenger compartment. A number of other references are similar to this invention.

P;almer, II et al. '193 shows a protective cover for the frame surrounding the front windshield of a motor vehicle. This protective cover is a single molded unit designed to conform to the natural shape of the frame surrounding the front windshield of the motor vehicle. The main attachment mechanisms are disclosed, located at right and left vertical portions of the device which are continuous extensions of the protective cover itself. The outer edges of the attachment mechanisms hook around the backside of the vertical frame post of the motor vehicle and, by so doing, create a pulling force to secure the cover to the vehicle. Further disclosed is a hook and loop fastening device, applied to the inside of the upper portion of the cover to secure the upper portion to a Jeep-type or open-type vehicle.

Desmond et al. '725 shows a law enforcement high risk vehicle windshield protective device which discloses a bullet resistant panel pivotally mounted to the underside of the roof of the automobile adjacent the windshield, which slides within a pair of tracks on the forward side edges of the bullet panel, so that it can be pulled down from inside the automobile and extended behind the windshield inside the car to protect an occupant and alternatively stored away at the under side of the roof within the car when not is use.

Monteath et al., '881 shows another vehicle windshield protective curtain which is housed and secured from inside a car.

Logue '255 shows a combined load cover and windshield protector for a dump truck, disclosing two hinged cover plates attached to the dump truck to provide a load cover, and power means to lift the cover plates for loading to move the plates to an upright semi-folded position; and then to a forward, full-folded horizontal position over the driver cab of the truck to provide only partial upper protection to the windshield of the truck. Further disclosed is as spring to give the two cover plates spreading action when they are brought to their intermediate vertical position and to give them counter-balancing action when the plates are in the cover position. Logue further shows that the forward end of the first cover plate is pivotally mounted at the front of the body of the truck's load box, and that the free end of the second cover plate is guided on an upper rail positioned on top of the load box walls, during covering and uncovering thereof. The power cylinder of this device includes means for shifting the base to allow what it discloses as over-center action in both directions of movement of the cover plates, with water seals being provided at the front of the dump truck's load box and at the middle hinge of the device. The Logue reference does not disclose manual releasable coupling means, does not mount to provide substantial protection to the windshield, does not mount or position to provide protection to the hood area of a vehicle and does not disclose pivotal hinge means mounted to a support surface functionally adjacent and reasonably, positionally available to the outside surface of a windshield, among other substantial differences as compared to the present invention.

The Morre '714, Pace '538, and Fahrney '834 references disclose curtain type devices with securing means differing from the present invention, with each lacking the capacity to reasonably move from one position to another to protect another surface proximate to or adjoining the windshield of a vehicle as provided in the present invention.

None of the references found in the prior art found specifically illustrate or disclose the windshield protection guard and combination support surface assembly of the present invention. Nor is the present invention obvious in view of any of the prior art references listed. In addition, all of the relevant prior art heretofore known suffer from a number of disadvantages.

None of the apparently crowded, prior art references teach concepts of invention which provide a relatively simple protective windshield guard and combination support surface assembly, for installation and use on surfaces immediately or proximately adjoining a windshield of multiple types of vehicles; and which possess the quality of being easy to manually pivot and secure to more than one position to provide protection and a usable support surface area over another adjoining front surface area of a vehicle such as a hood area of a vehicle.

In the past, there have been many problems in design and construction associated with attempting to provide a multi-purpose windshield protective guard and/or combination support surface, which was simple in design and construction, and was installation-friendly with regard to attachment to proximate or adjacent surfaces readily available on a vehicle adjoining both a windshield and a hood area of a vehicle.

Also, none of the prior art devices in this area of technology have been easily functional in being manually secured for use in truly protecting a windshield, as well as providing other uses in connection with other support surfaces on a vehicle.

None of the prior art devices have utilized a mesh, wire or fence-like construction to protect a windshield and other adjacent surfaces of a vehicle.

Other prior art devices have not utilized suitable hinge-pivot means or convenient user-friendly pin, wing-nut, or other suitable biasing or coupling means to properly and conveniently secure a windshield protection guard for meaningful use.

The prior art has also been deficient in providing an easily workable design and simple construction which was readily functional in providing pivotal or rotational movement to serve a plurality of protective or support purposes.

Nor is the prior art been shown to provide functional configurations of construction which would provide for, serve and/or adapt to the presence of vertically oriented structures or devices present on the hood of a vehicle such as a snorkel apparatus, which require a protective guard or support surface which would easily fit around or over such an apparatus on the hood of a vehicle.

Other prior art devices have not advantageously addressed the need for a strong support frame which functioned as a support perimeter for the protection member, together with providing accessory support which would not interfere with available hinge means allowing pivotal movement; nor has the prior art provided a cylindrical-type hinge which worked easily with such a support frame and was readily equipped with lubrication means for easily servicing the hinge member.

Additionally, none of the prior art devices have been provided such that they could be easily utilized on a number of vehicles having different and varied windshield and front end and hood areas of different configuration and construction, such as hummer-type vehicles, jeeps, traditional and distinctive passenger and sports cars, military vehicles and various boats, ships planes and/or helicopters, as well as submarines, and other diverse vehicles and transportation devices.

These and other disadvantages, structurally and functionally, of the prior art will become apparent in reviewing the remainder of the present specification, claims and drawings.

Accordingly, it is an object of the present invention to provide a substantially improved windshield protection guard and combination support surface assembly having substantially enhanced construction and versatility of use with regard to available support surfaces of a diversity of types of vehicles and other devices and apparatus.

It is a further object to provide a pivoting protective guard which can serve more than one surface of a vehicle, boat, ship, plane or military device such as a missle, torpedo, or other like or comparable device or means, or recreational device or vehicle such as a ski or water jet-type vehicle, submergible device or vehicle, and other types of vehicles or devices which travel from one point to another; both with and without windshield members, which have more than one surface needing protection or support, or cantilevered support, over or adjacent thereto; which is of reasonably simple construction and strong support and resiliency for multi-purpose use.

It is yet a further object of the present invention to provide a special, novel hinge means, which is easily serviceable for lubrication; and which readily and advantageously provides ease of pivotal and rotational movement to a support frame and protective member serving a plurality of adjacent or available surfaces on a vehicle or other device or apparatus.

It is another object of the invention to provide, in preferred embodiments, a pin-secured, releasable coupling means or a wing-nut, handled securing device fitting over a threaded member, to provide convenient securement of a guard/support member to at least first and second surfaces, such as a roof area and a hood area of a vehicle.

A further object of the invention is to provide meaningful, strong protection to a windshield or other surface, while retaining the optional use of providing a secure, resilient support surface, upon pivotal positioning, of a hood area or second surface of a vehicle or like device.

It is yet a further object of the present invention to provide a protective guard and optionable support surface utilizing a mesh-like protective member, in preferred embodiments, which can be provided in various configurations to provide installation-friendly configuration for utilization in relation to front and other areas of a vehicle or like device, having various other items or members having vertical and horizontal dimensions, installed on such areas, such as a snorkel, ornament, raised hood area, antenna, or other type of member or device.

It is still a further object of the novel windshield protection guard and combination support surface assembly of the present invention to provide such an assembly which can be utilized on a vehicle, either with or without an actual windshield; and be used in an area containing any available adjacent attachment surfaces, for protection and support in relation to at least two such surfaces on a multitude of vehicles, devices or apparatus; or can be utilized for support in relation to, or protection, of other proximately located surfaces or members.

A further object exists in providing a mesh-type guard member, or like construction, which can be releasably secured away from a surface like a windshield when not needed for that specific use; and when installed for use adjacent to the windshield, and for protection thereof, is of such a construction that a person can easily see through the guard, when in a vehicle, and can have a substantially clear field of vision when using the present invention as a windshield protective guard.

It is yet a further object of the invention to provide a combination protective guard and support surface which can be easily moved and secured to at least two positions, by easy accessible manual position by a user; and does not require any power means for such positioning, although the invention can be provided in at least one embodiment with a power means for accomplishing such positioning and securement.

It will, therefore, be understood that substantial and distinguishable structural and functional advantages are realized in the present invention over the prior art devices; and that the present invention's simplicity of structure, diverse utility, and broad functional applications serve as important bases of novelty and distinction in this regard.

SUMMARY OF THE INVENTION

The foregoing and other objects of the invention can be achieved with the present invention device, system and assembly which is a windshield protection guard and combination support surface assembly. The invention is provided with a guard and support member having first and second sides. The invention is further provided with a support frame member having first and second lengthwise side members and first and second widthwise portion members. The first lengthwise side member has a first end, a middle portion, and a second end, and has at the first end thereof a first hinge extension member; and at the second end thereof, a second hinge extension member. Each of the first and second hinge extension members has an inboard portion and an outboard portion. The second lengthwise side member has a first end portion, a middle portion, and a second end portion. The first and second widthwise portion members each have first and second ends. The first end of the first widthwise portion member is attached to the first end of the first lengthwise side member so that it adjoins, without touching, the inboard portion of the first hinge extension member, and the second end of the first widthwise portion member is attached to the first end portion of the second lengthwise side member. Additionally, the first end of the second widthwise portion member is attached to the second end of the first lengthwise side member so that it adjoins, without touching, the inboard portion of the second hinge extension member; and the second end of the second widthwise portion member is attached to the second end portion of the second lengthwise side member. Therefore, in so doing, when the first and second widthwise portion members are attached to the first and second lengthwise side members, the support frame member defines the perimeter of the guard and support member, so that each of the first and second hinge extension members of the first lengthwise side member extend free and outboard of the respective attachment of the first and second widthwise portion members.

The invention is also provided with a first hinge, attached to the first hinge extension member of the first lengthwise side member of the support frame member, for securely supporting, and allowing rotational movement of, the first hinge extension member. The invention also has a second hinge, attached to the second hinge extension member of the first lengthwise aide member of the support frame member, for securely supporting, and allowing rotational movement of, the second hinge extension member.

The invention assembly is further provided with first, second, third and fourth coupling subassemblies. The first coupling subassembly is attached proximal and adjacent to the first end portion of the second lengthwise side member of the support frame member, for securement to an attachment or installation site. The second coupling subassembly is attached proximal and adjacent to the second end portion of the second lengthwise side member of the support frame member, for securement to an attachment or installation site. The third coupling subassembly is attached to the middle portion of the second lengthwise side member of the support frame member, and is spaced for and opposite to the first coupling subassembly, for securement to an attachment or installation site. While the fourth coupling subassembly is attached to the middle portion of the second lengthwise side member, spaced from the third coupling subassembly, and spaced as well from, and opposite to, the second coupling subassembly, for securement to an attachment or installation site.

BRIEF DESCRIPTION OF THE DRAWINGS

FIG. 4 is a partial enlarged scale side view of the embodiment of the invention of FIG. 1.

FIG. 5 is a partial enlarged left side view of the preferred embodiment of the present invention of FIG. 2.

FIG. 8 is an enlarged scale left side view of the preferred embodiment of the invention of FIG. 1, illustrated in an installed position on a vehicle; the vehicle being shown schematically, by example.

FIG. 9 is a top view of the preferred embodiment of the invention of FIG. 1.

FIG. 10 is a bottom view of the preferred embodiment of the invention of FIG. 1.

FIG. 11 is an enlarged scale right side view of the preferred embodiment of the invention of FIG. 1, illustrated in an installed position on a vehicle, as an example by schematic illustration, of an optional installation site for the invention.

FIG. 12 is an enlarged scale partial perspective view of the preferred embodiment of the invention illustrated in FIG. 3.

FIG. 13 is another enlarged scale partial perspective view of a portion of the preferred embodiment of the invention of FIG. 3.

Figure 1:
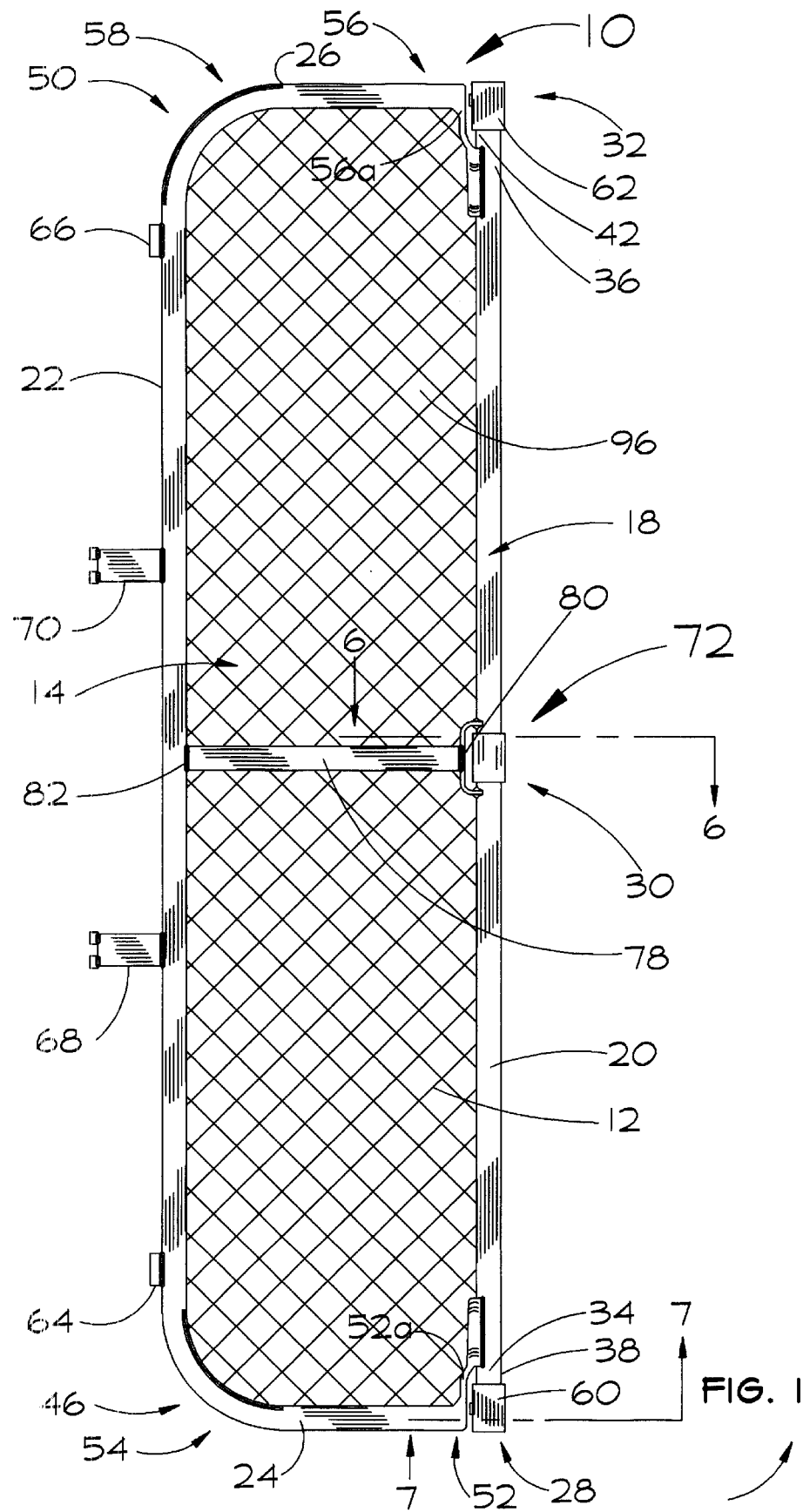
FIG. 1 is a front view of a preferred embodiment of the novel windshield protection guard and combination support surface assembly of the present invention.

The vehicles shown in FIGS. 3, 4, 5, 7, 8, 11 through 24, and 26 through 30, are illustrated by schematic representation to represent one of the many possible installation environments, on which, or in combination with which, the invention can be installed, attached, or connected, as set forth in the preamble of the claims; and do not specifically constitute part of the present invention.

The arrows shown in FIGS. 14 through 24, 26, 27, 29, and 30, constitute schematic representation of one preferred embodiment of positional movement, pivotally, rotationally, or otherwise, of the present invention, as examples, only, of such movement. In this regard, broken lines are utilized in FIGS. 15, 18, and 30, to represent dihedral positional relationships in preferred embodiments of the invention as set forth in the specification hereof.

REFERENCE NUMBERS IN DRAWINGS

10 Windshield Protection Guard And combination Support Surface
12 guard and support member
14 first side of (12)
16 second side of (12)
18 support frame member
20 first lengthwise side member of (18)
22 second lengthwise side member of (18)
24 first widthwise portion member of (18)
26 second widthwise portion member of (18)
28 first end of (20)
30 middle portion of (20)
32 second end of (20)
34 first hinge extension member of (28)
36 second hinge extension member of (32)
38 inboard portion of (34)
40 outboard portion of (34)
42 inboard portion of (36)
44 outboard portion of (36)
46 first end portion of (22)
48 middle portion of (22)
50 second end portion of (22)
52 first end of (240

52a cantilevered portion or section
54 second end of (24)
56 first end of (26)
56a cantilevered portion or section
58 second end of (26)
60 first hinge
62 second hinge
64 first coupling member
66 second coupling member
68 third coupling member
70 fourth coupling member
72 third hinge
74 first end portion of (72)
76 second end portion of (72)
78 third widthwise portion member of (18)
80 first connection end of (78)
82 second connection end of (78)
84 third portion attachment member of (80)
84a first end of (84)
84b second end of (84)
86 vehicle (installation environment of invention, not part thereof)
88 first support area of (86)
90 second support area of (86)
92 third support area of (86)
94 windshield or surface of (86)
96 open spaces of (12)
40a end portion of (40)
44a end portion of (44)
98 axial plane of (40a and 44a)
100 first coupling mate
102 second coupling mate
104 third coupling mate
106 fourth coupling mate
108 first position
110 second position
112 axis (perpendicular to 98)
114 installation channel of (60)
116 installation channel of (62)
118 open channel portion of (114)
120 stop-support wall of (114)
122 open channel portion of (116)
124 stop support wall of (116)
126 through-channel of (72)
128 port hole of (60)
130 port hole of (62)
132 port hole of (72)
134 lubrication port member of (60)
136 lubrication port member of (62)
138 lubrication port member of (72)
140 first configurational portion of (18)
142 second configurational portion of (18)
144 side portion of (142)
146 installation pi aperture of (64)
148 first coupling element of (100)
150 second coupling element of (100)
148a a pin securement aperture of (148)
150a a pin securement aperture of (150)
152 pin securement member of (100)
154 installation pin aperture of (66)
156 first coupling element of (102)
158 second coupling element of (102)
156a pin securement aperture of (156)
158a pin securement aperture of (158)
160 pin securement member of (102)
162 first coupling element of (68)
162a pin securement aperture of (162)

164a pin securement aperture of (164)
164 second coupling element of (68)
166 installation pin aperture of (104)
168 pin securement member of (104)
170 first coupling element of (70)
172 second coupling element of (70)
170a pin securement aperture of (170)
172a pin securement aperture of (172)
174 installation pin aperture of (106)
176 pin securement member of (106)
178 plate member of (68)(different embodiment)
180 stud-hole of (178)(different embodiment)
182 threaded stud member of (104)(different embodiment)
184 handle-wing nut member of (104)(different embodiment)
186 threaded installation hole of (184)
188 plate member of (70)(different embodiment)
190 stud-hole of (188)
192 threaded stud member of (106)(different embodiment)
194 handle-wing nut member of (106)(different embodiment)
196 threaded installation hole of (194)(different embodiment)
198 arcuate positional course of (18)
200 dihedral angel of (12 and 18)
202 hinge attachment means or connections

DETAILED DESCRIPTION OF THE PREFERRED EMBODIMENTS OF THE INVENTION

The following description of the preferred embodiments of the concepts and teaching of this invention is made in reference to the accompanying drawing figures which constitute preselected illustrated examples of the structural and functional elements of the present invention, among many other examples existing within the scope and spirit of the invention.

Referring now to the drawings, FIGS. 1, 2, 3, 8 through 11, and 14 through 19, thereof, there is shown a windshield protection guard and combination support surface assembly 10, of the present invention, referred to herein as the assembly 10.

The assembly 10 is provided with a guard and support member 12 having at least a first side 14 and a second side 16. The assembly 10 also has a support frame member 18, provided with a first lengthwise side member 20, a second lengthwise side member 22, a first widthwise portion 24, and a second widthwise portion portion 26.

The first lengthwise side member 20 is provided with a first end 28, a middle portion 30, and a second end 32. The first end 28 of the first lengthwise side member 20 has a first hinge extension member 34; while the second end 32 has a second hinge extension member 36. The first hinge extension member 34 has an inboard portion 38 and an outboard portion 40; and the second hinge extension member 36 also has an inboard portion 42 and an outboard portion 44.

The second lengthwise side member 22 is provided with a first end portion 46, a middle portion 48, and a second end portion 50.

The first widthwise portion member 24 is provided with a first end 52 and a second end 54; and the second widthwise portion member 26 has a first end 56 and a second end 58.

The first end 52 of the first widthwise portion 24 is attached or integrally connected to the first end 28 of the first lengthwise side 20 is such a way that it adjoins, without touching, the inboard portion 38 of the first hinge extension 34, as illustrated by example in FIGS. 1, 2, 3, and 12. The second end 54 of the first widthwise portion 24 is attached or integrally connected to the first end portion 46 of the second lengthwise side 22.

The first end 56 of the second widthwise portion 26 is attached or integrally connected to the second end 32 of the first lengthwise side 20 in a manner so that it connectively adjoins, without touching, the inboard portion 42 of the second hinge extension 36; and the second end 58 of the second widthwise portion 26 is attached or integrally connected to the second end portion 50 of the second lengthwise side 22.

By so doing, the first 24 and the second 26 widthwise portions are attached or integrally connected to the first 20 and the second 22 lengthwise side members; and when they are attached in this manner, the support frame member 18 substantially or generally defines in its attached positional configuration or orientation the perimeter or boundary of the guard and support member, as illustrated by example in FIGS. 1, 2, 3, 12, and 20 through 24. Also, by virtue of this connection orientation; the first hinge extension 34 of the first lengthwise side 20 extends positionally free and outboard of, or extended away from, the attachment of the first widthwise portion 24; and the second hinge extension 36 of the side 20 extends positionally free and outboard of, or extended away from by some spacial distance, the attachment of the second widthwise portion 26; as illustrated, generally, by example, in FIGS. 1, 2, 3, 7, 8, 11, 12, and 14 through 24.

In this regard, in a preferred embodiment, the first end 52 of the first widthwise portion 24 is provided with a cantilevered portion or section 52a which extends positionally over, under, or otherwise positionally, to attach or be integrally connected to the first end 28 of the first lengthwise side 20 so that it adjoins, without touching or impeding, the inboard portion 38 of the first hinge extension 34. Also, the first end 56 of the second widthwise portion 26 is provided with a cantilevered portion or section 56a which extends positionally, over, under, or otherwise positionally, to attach or be integrally connected to the second end 32 of the first lengthwise side 20 so that it adjoins, without touching or impeding, the inboard portion 42 of the second hinge extension 36. The cantilevered portions 52a and/or 56a are illustrated in FIGS. 1, 2, 3, 4, 5, 7, 8, 11, 12, and 14 through 24. The portions 52a and 56a can be provided in the form of a cornice, entablature, horizontal or otherwise positioned superstructure, architrave, frieze, bracket or block projection, anchored projecting member or/and cantilevered support or means, cantilevered bridge-type, or other type of supported projecting member.

The assembly 10 is further provided with at least a first hinge 60 and a second hinge 62.

Figures 6, 7:
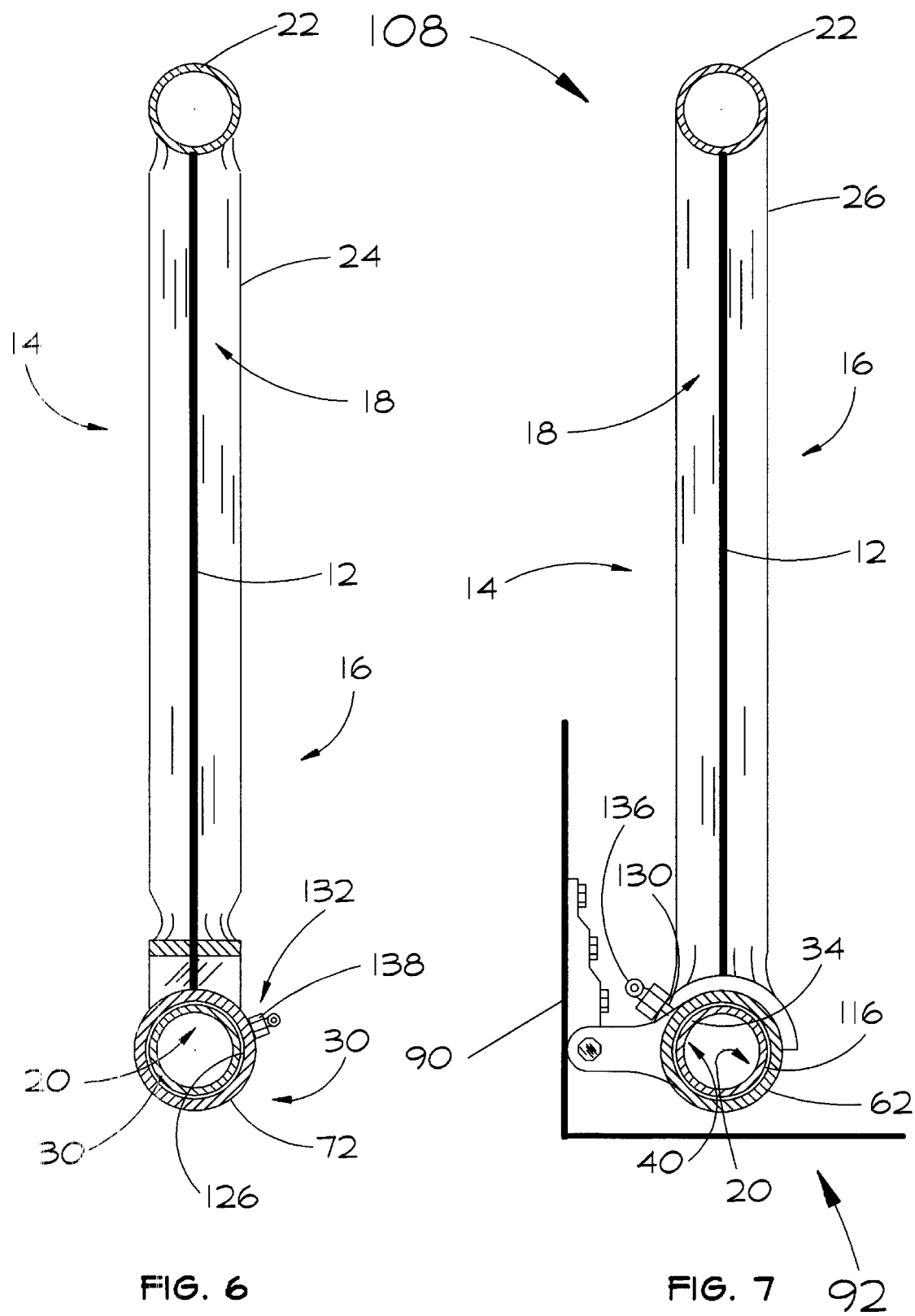
FIG. 6 is an enlarged scale cross-sectional view taken along line 6—6 of FIG. 1.
FIG. 7 is an enlarged scale cross-sectional view taken along line 7—7 of FIG. 1.

The hinge 60 is attached or connected to the first hinge extension 34 of the side 20 of the support frame 18; and is provided in one preferred embodiment of the invention as a hinge means which structurally provides and allows both secured support and pivotal or rotational movement of the hinge extension 34; as illustrated in FIGS. 4 and 7, among other drawings.

The hinge 62 is attached or connected to the second hinge extension 36 of side 20 of the frame 18; and is also provided in one preferred embodiment as a hinge means which structurally provides and allows both secured support and pivotal or rotational movement of the hinge extension 36, as illustrated in FIGS. 5 and 7, among other drawings provided herewith.

The assembly 10 is also provided with a first coupling member 64, a second coupling member 66, a third coupling member 68, and a fourth coupling member 70; in one preferred embodiment of the invention. The coupling 64 is attached or integrally connected to the second lengthwise side 22 of the frame 18, in one preferred embodiment, so that it is positionally proximal or adjacent to the first end portion 46 of side 22. The coupling 64 is utilized in the invention to releasably secure (so that it can be detached) its adjacently attached portions of the frame 18 to a preselected attachment, mating, or coupling site on a vehicle or other device or apparatus desired for installment.

The coupling 66 is attached or integrally connected to the second lengthwise side 22, in a preferred embodiment, so as to be positionally proximal or adjacent (or closer) to the second end portion 50 of side 22; and is utilized to releasably or detachably secure its adjacently attached portions of frame 18 to a preselected attachment, mating, or coupling site, as indicated, on a vehicle or other surface.

Coupling members 64 and 66, therefore, help to facilitate coupling or securement of the second lengthwise side 22 of the support frame 18 in a preselected, or chosen, position on the surface of a vehicle or other device or member the subject of installation.

The coupling 68 is attached or connected to the middle portion 48 of the second lengthwise side 22, or substantially or generally in this area; and is positioned on the middle portion 48 so as to be spaced, or a distance from, and opposite in position to, the first coupling 64. Coupling 68 is utilized to help facilitate securement of the side 22 to another attachment site which is different in position or installation location than that of the securement of coupling members 64 and 66; as illustrated by example in FIGS. 1, 2, 3, 14, 16, 17, and 19 through 24.

The coupling 70 is attached or connected to the middle portion 48 of the side 22, or substantially or generally in this area; and is so positioned so as to be spaced or at a distance from the coupling 68, and also being spaced or located a distance from, while being opposite to, the coupling 66. Coupling 70 is also utilized to help facilitate securement of side 22 to another attachment site different from the location of the coupling members 64 and 66; and will, because of the positioning of coupling 70, also be used for securement in a location different from that of the securement site for coupling 68; as illustrated in FIGS. 1, 2, 3, 14, 16, 17, and 19 through 24.

The support frame 18 of the assembly 10 of the present invention is also provided, in a preferred embodiment, with a third hinge 72, as illustrated by example in FIGS. 1, 2, 3, 6, 9, 10, 13, and 20 through 23. The hinge 72 has in one embodiment a first end portion 74 and a second end portion 76; and is attached or connected along the middle portion 30 of the side 20 of the frame 18. It is utilized to facilitate support and to allow pivotal or rotational movement of the adjacently mated and connected part of the middle portion 30 of side 20. As is the case regarding the first and second hinges 60 and 62, it will be recognized that the hinge 72 can be constructed of various diverse types of material and can take the structural form, within the spirit of the invention, of a number of diverse types of hinge and/or rotational or pivotal movement, hinge clasp, joint, natural integral joint or other door-like, gate-like or swinging movement device, including but not limited to structures similar to fast butt, loose pin butt, hinge, strap, biased and/or shutter type hinge means.

The support frame 18, in one preferred embodiment of the assembly 10, is further provided with a third widthwise portion member 78 having a first connection end 80 and a second connection end 82, as illustrated in FIGS. 1, 2, 3, 6, 13, and 20 through 23.

The first connection end 80 has a third portion attachment member 84, which, as a part of the teaching of the invention, provides means for attaching the third widthwise portion 78 to the middle portion 30 of the side 20 of the frame 18 in such a way and position that the attachment member 84 is spaced or a distance from, while remaining adjacent to, the first end portion 74 and the second end portion 76 of the secured third hinge 72. In one embodiment of the invention the attachment member 84, illustrated in FIGS. 1, 2, 3, 6, 13, and other drawings, is shown as a bridge-type, or cantilevered bridge-type, structure having first and second ends 84a and 84b, respectively, attached at either end, as indicated and illustrated, to the middle portion 30 of side 20; so as to adjoin, or be in proximate location to, without actually touching or impeding, the respective first and second portions, 74 and 76, of the third hinge 72. It will be recognized that the attachment 84 can be of many different types of structure and visual and/or positional configurations to accomplish the use, purpose and teaching, indicated above, of the present invention.

The second connection end 82 of the third widthwise portion 78 is attached or integrally connected to the middle portion 48 of the side 22. The portion 78 is also further attached or connected to the guard and support member 12 along the entire length, or portions of this length, between its first and second connection ends 80 and 82. It will be understood in this regard that the member 12 can be secured to the portion 78 by many diverse and different ways or means, or can be integral in attached or connected form or structure.

In another important embodiment of the present invention the assembly 10 is provided for use in an installation environment where the invention is utilized in combination with a vehicle 86, or other device, having at least a first, second and third support area, 88, 90, and 92, respectively; where each of these areas are positionally adjacent, or close to, a windshield 94, or other surface for which protection, support or coverage is sought in relation to, of the vehicle 86, or other device or apparatus having such a surface; as illustrated, generally, by example, in FIGS. 3, 4, 5, 7, 8, 11, 12, and 14 through 24.

In this embodiment the invention is used, when the assembly 10 is installed and secured in relation to the support areas 88, 90 and 92; in a first position 108 (as illustrated by example in FIGS. 16, 19, and 20 through 24) when adjacent, or close to, the first support area 88, for protection of the windshield 94; and in a second position 110 (shown by example in FIGS. 3, 14, and 17) when adjacent, adjoining, or close to, the third support area 92, as a support and/or protective surface covering, adjoining, or overlying the third support area 92 of the vehicle 86.

In this preferred embodiment, the guard and support member 12 is provided in the form of a mesh-structured member, preferably having or defining at least some degree or amount of open space or spaces 96, including, but not limited to net, screen, sieve-like, threaded, cord-like, woven, interlocking metal link-type, snare-like, teeth-like, and other diverse types of open spaces or like configurations. One preferred type of guard and support 12 is provided in the form of a wire mesh, as illustrated generally by example in FIGS. 1, 2, 3, 12, 13, and 20 through 24. However, it will be recognized, as indicated above, that many diverse types of mesh structure and configuration, or like orientation, can be utilized and employed in the construction of the guard and support member 12 of the present invention.

In a preferred embodiment the support frame member 18 is fixedly or securely attached to the guard and support member 12, provided in the form of a wire mesh member; and when it is attached in this manner, the member 12 acts to form the boundary, perimeter, periphery, or peripheral margins of the guard and support 12, as it is viewed from the front, back, side or in perspective, generally. Also, the first hinge extension 34 has an end portion 40a at the end boundary of its outboard portion 40; and the second hinge extension 36 has an end portion 44a at the end boundary of its outboard portion 44. See generally, by example, FIGS. 2, 7, 9, and 12. The end portions 40a and 44a are preferably positioned (although they may be differently positioned) along an axial plane 98, as generally shown by example in FIG. 3.

Also, in a preferred embodiment, the first coupling 64 is attached or integrally connected to the support frame 18 so that it is located generally or substantially opposite positionally, while still remaining proximal, or a shorter distance, from the end portion 40a of the first hinge extension 34. The second coupling 66 is attached or connected to the support frame 18 so that it is located generally opposite positionally, while still remaining proximal, or a shorter distance from, the end portion 44a of the second hinge extension 36. This positional relationship of the couplings 64 and 66 is shown by example in FIGS. 1, 2, 3, 15, 18 and 20 through 24.

Additionally, in this embodiment, the assembly 10 of the invention is provided with a counter-mating, first coupling mate 100 and a second coupling mate 102. The mate 100 is attached or connected to the first support area 88 of the vehicle 86 in such a position or location that it can positionally mate, join or interconnect with the first coupling 64, where it can releasably or detachably be secured with coupling 64. The mate 102 is attached or connected to the area 88 in a position or location where it can positionally mate, join or interconnect with the second coupling 66 for releasable securement with this coupling; as illustrated in the FIGS. listed just above.

In this embodiment the first hinge 60 is securely attached or connected to the second support area 90 of the vehicle 86, adjacent to the windshield 94; in a position or alignment where it can be coupled or interconnected with the first hinge extension 34, to provide a means to permit support and pivotal, or rotational, movement of the hinge extension 34. In like manner, the second hinge 62 is securely attached to the support area 90 in a position where it can be interconnected with the second hinge extension 36 for support, securement and movement of hinge extension 36.

The third coupling 68 in this embodiment is attached or integrally connected to the support frame 18 so that it is located generally opposite positionally from end portion 40a, while remaining distal, or further away from, end portion 40a than coupling 64 is; as illustrated generally by example in FIGS. 1, 2, 3, and 20. The fourth coupling 70 is attached or connected to frame 18, located opposite positionally from end portion 44a of extension 36, while remaining distal, or further away from end 44a than coupling 66 is.

Further in this embodiment, the third coupling mate 104 is attached or connected to the third support area 92 of vehicle 86, and is positionally located where it can couple with, and be detached from, the third coupling 68. While the fourth coupling mate 106 is attached to the support area 92 and located where it can couple or counter-connect with the fourth coupling 70. See FIGS. listed immediately above.

Figure 3:
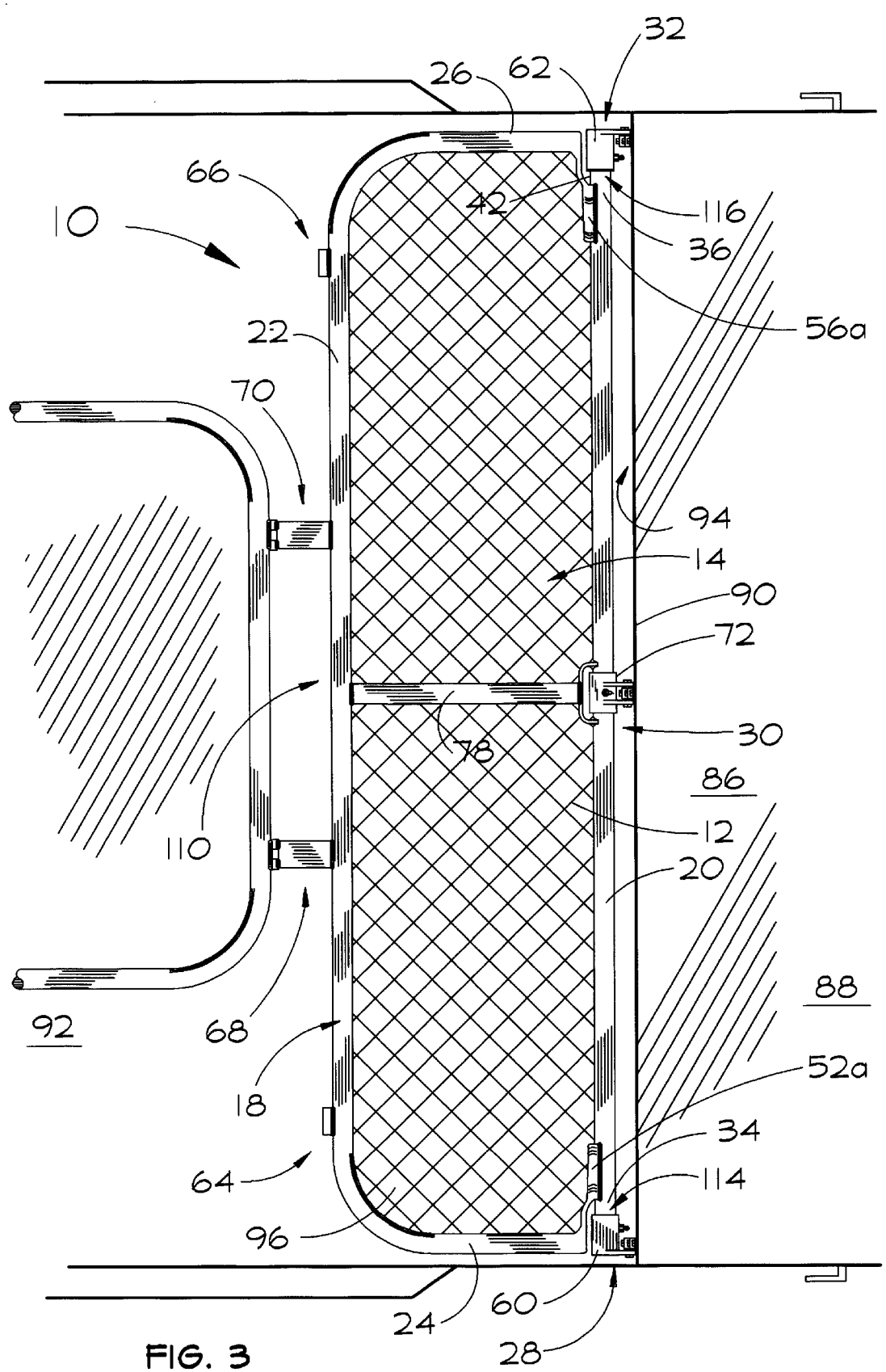
FIG. 3 is a reduced scale top view of the preferred embodiment of the present invention of FIG. 1, illustrating the invention installed on a vehicle in one of at least two operative positions as protective guard and support surface installed over the hood area of a vehicle; with coupling mates 100 and 102 not shown. The vehicle is shown schematically to represent one of many installation surfaces upon and with which the invention can be combined or used.
Figure 14:
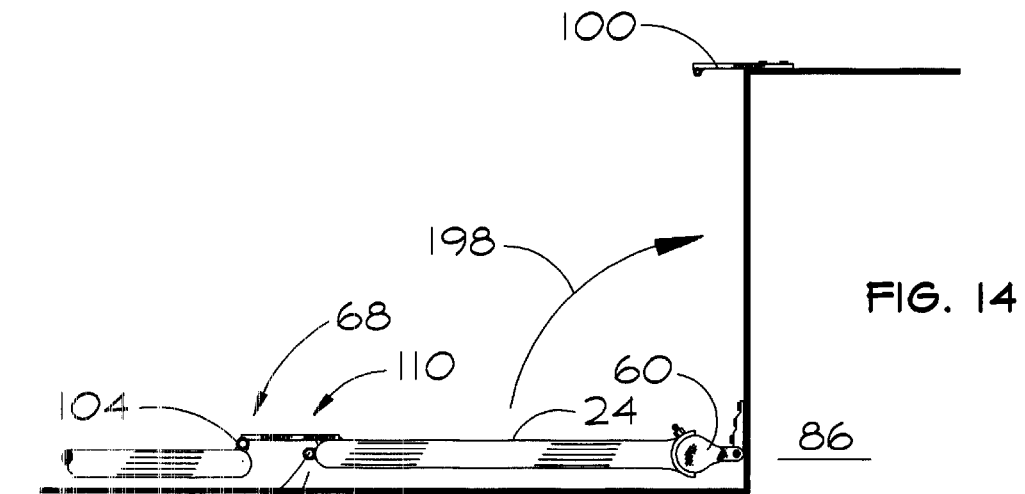
FIG. 14 is a left side view of the preferred embodiment illustrated in FIG. 1, illustrating the invention as installed on a schematic representation of a vehicle, showing the invention in one of its pivotal positions, aligned for coupling.
Figure 15:
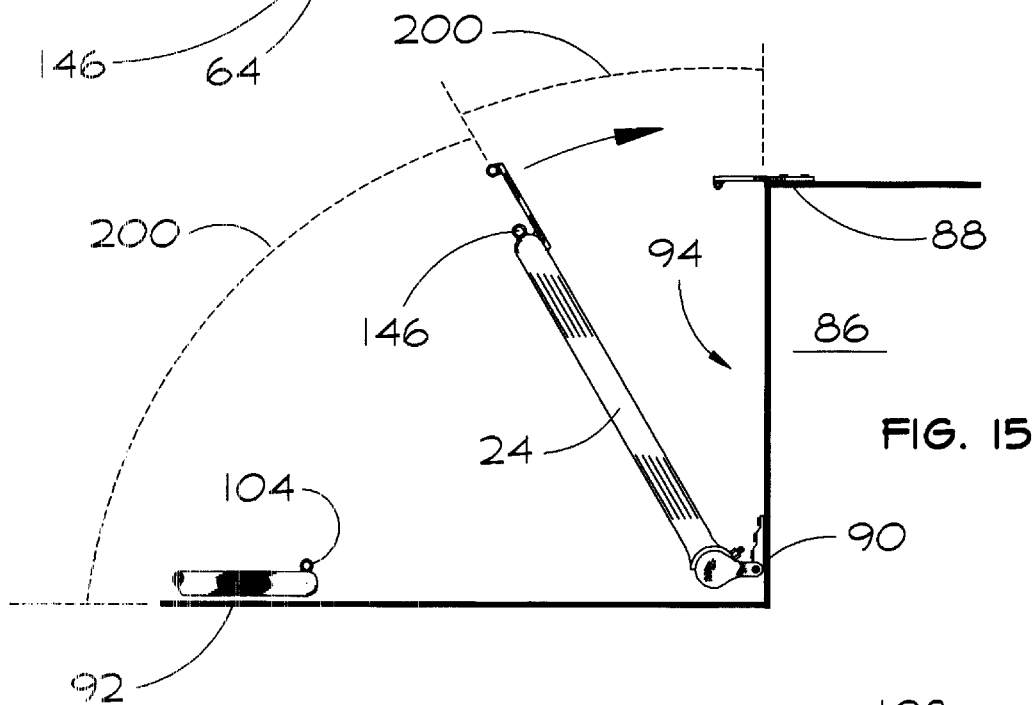
FIG. 15 is a further left side view of the embodiment of FIG. 1, showing the invention in one position along its course of pivotal movement, indicated generally by an arrow.
Figure 16:
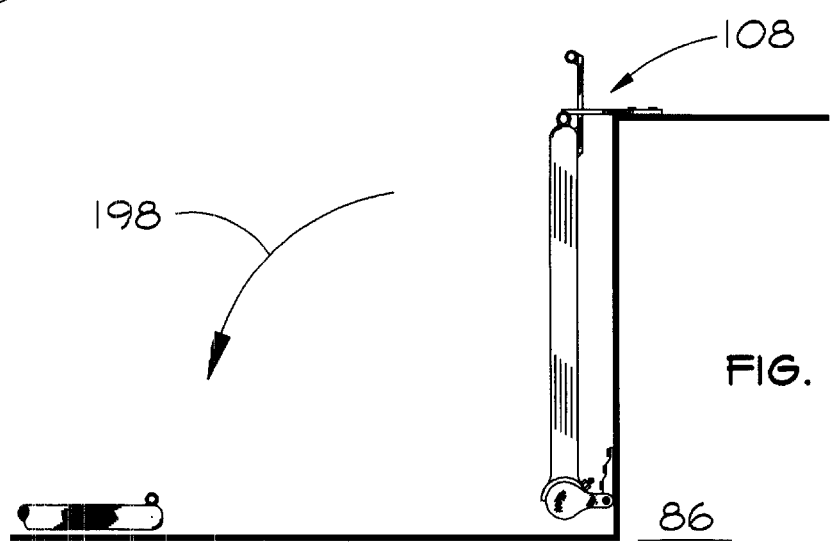
FIG. 16 is yet another left side view of the embodiment of FIG. 1, illustrating the invention as installed on a schematic representation of a vehicle, showing the invention aligned for coupling in another one of its pivotal positions.
Figure 17:
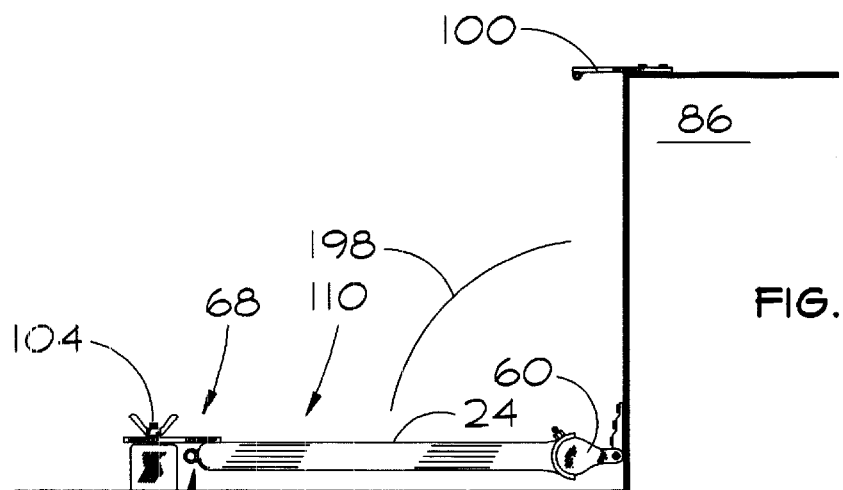
FIG. 17 is substantially a left side view of the embodiment illustrated in FIG. 1, illustrating the invention as installed on a schematic representation of a vehicle, and further showing another embodiment of coupling for the invention.
Figure 18:
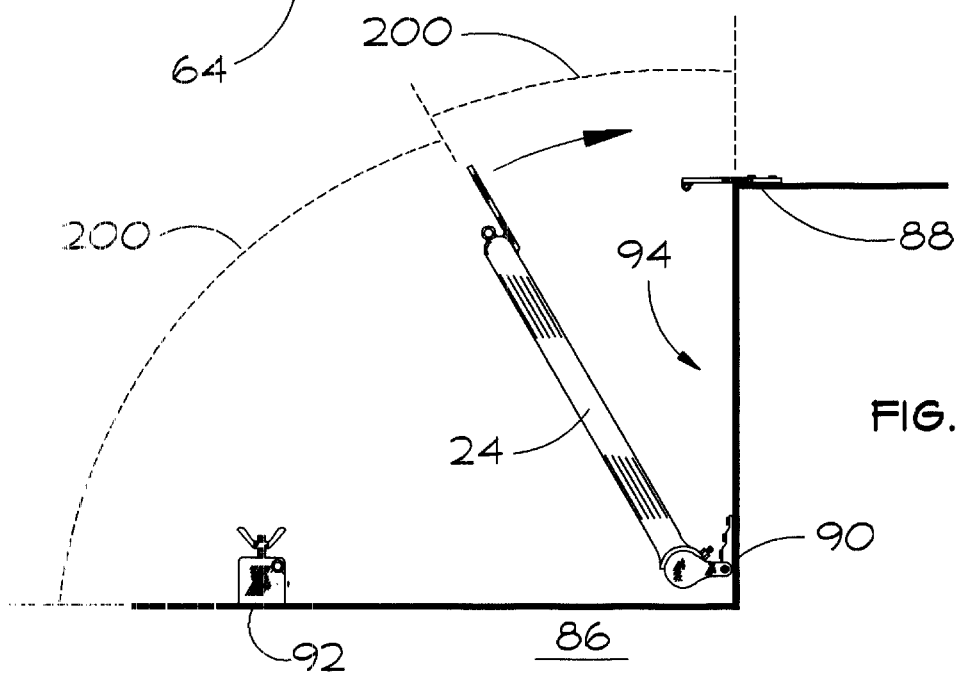
FIG. 18 is a further left side view of the embodiment of FIG. 1, showing the invention in one position along its course of pivotal movement, indicated generally by an arrow, and further showing another embodiment of coupling for the invention as illustrated in FIG. 17.
Figure 19:
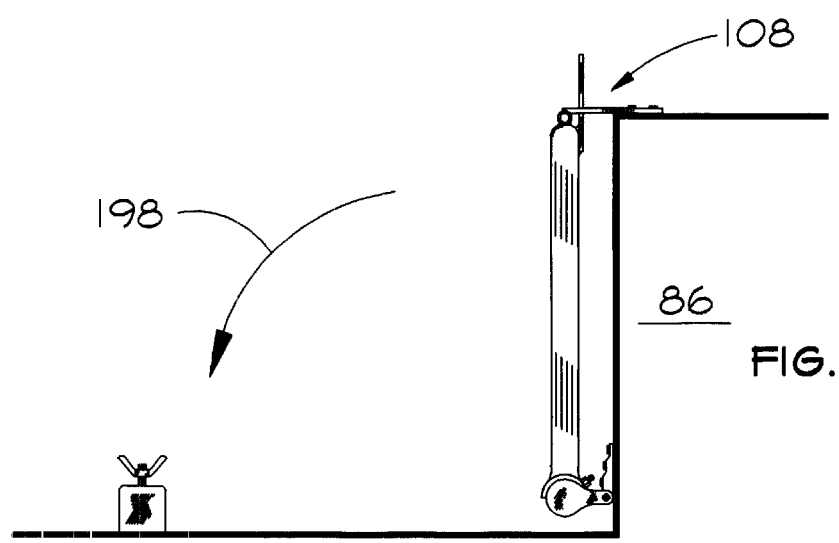
FIG. 19 is yet another left side view of the embodiment of FIG. 1, illustrating the invention as installed on schematic representation of, a vehicle, and further showing the invention aligned for coupling in another one of its pivotal positions, and the same embodiment of coupling as illustrated in FIGS. 17 and 18.
Figure 20:
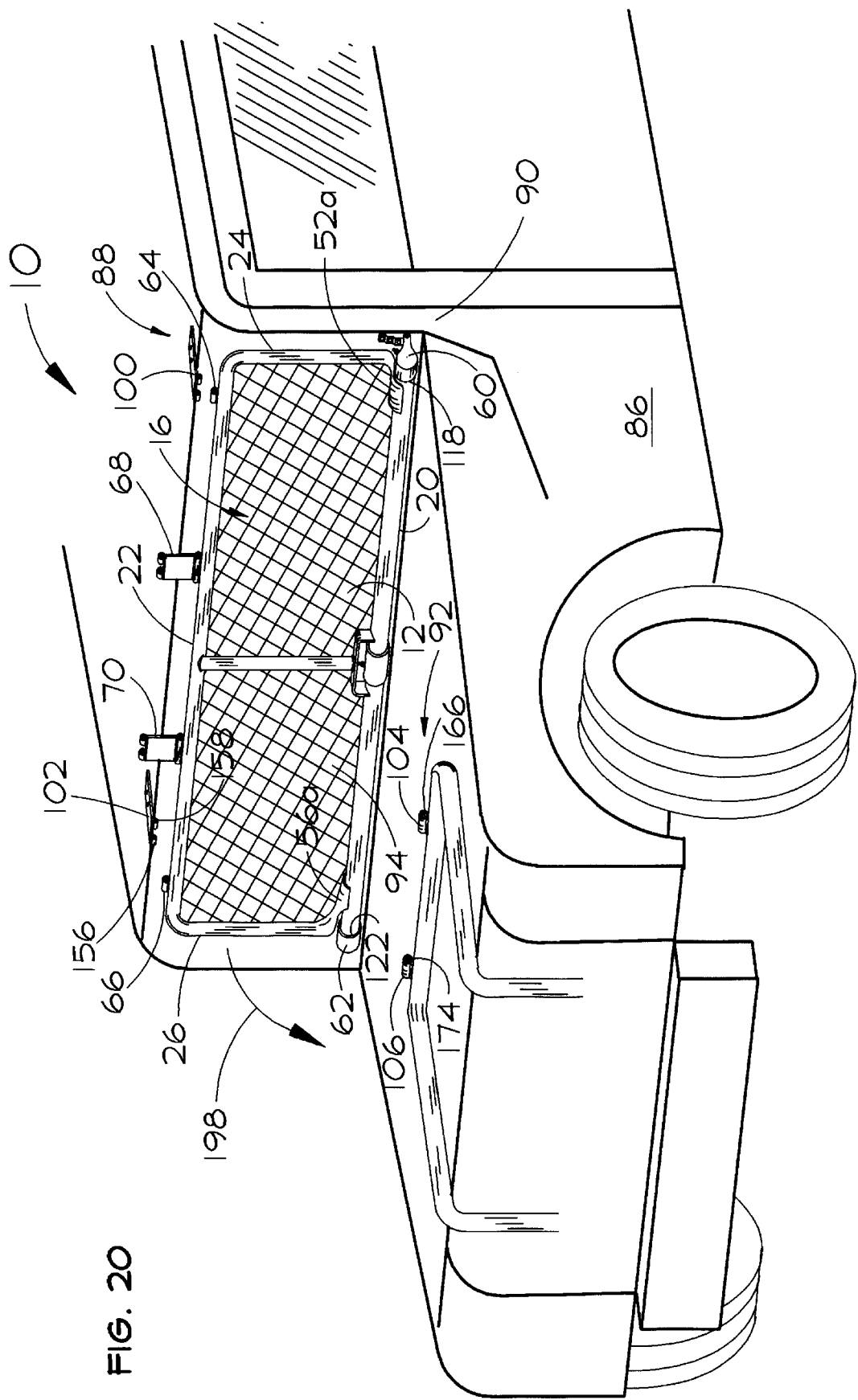
FIG. 20 is a reduced scale perspective of the embodiment of the invention of FIG. 1, shown installed on a schematic representation of a vehicle; also showing a perspective of the embodiment of coupling illustrated in FIG. 3.
Figure 21:
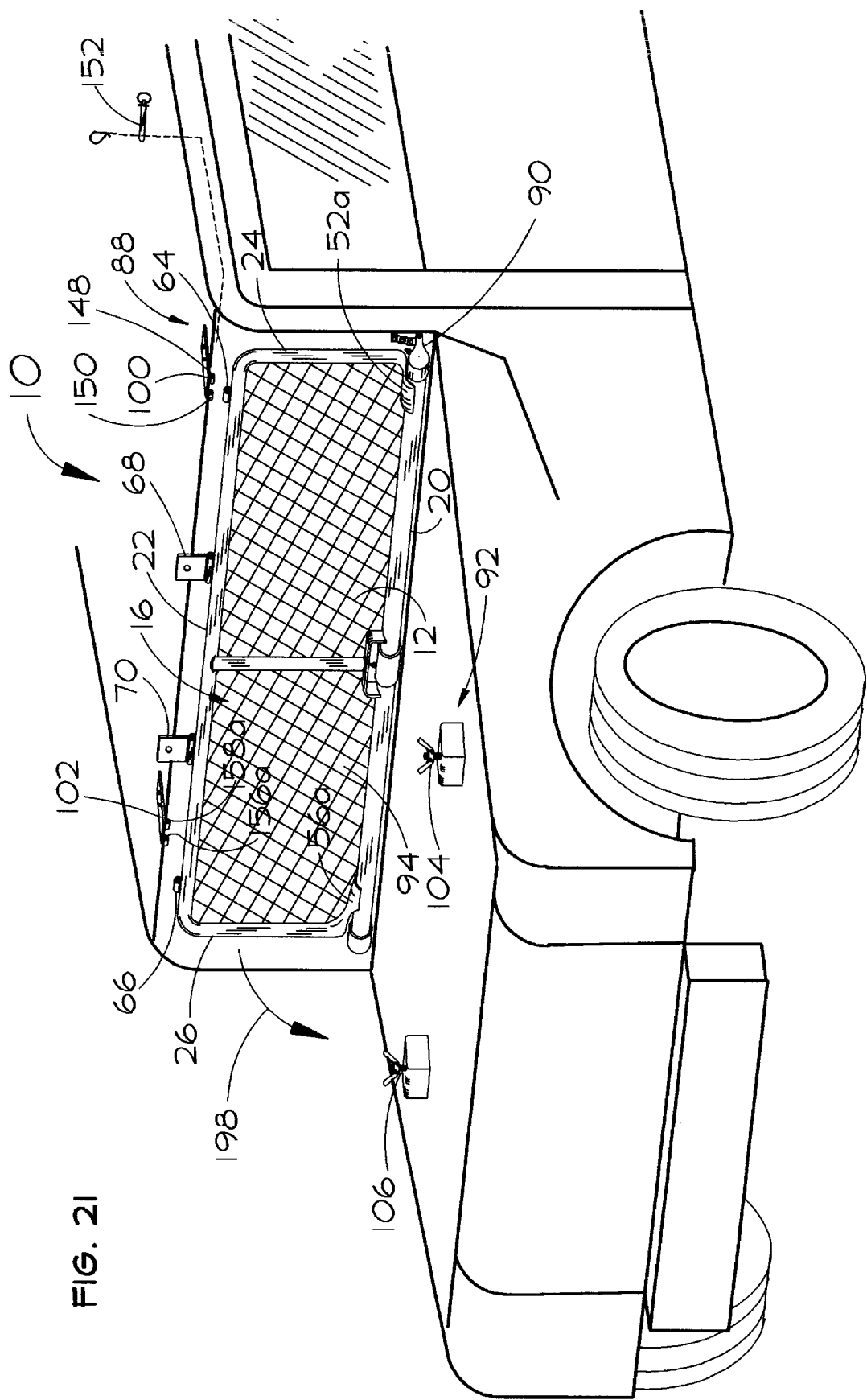
FIG. 21 is a reduced scale perspective of the embodiment of the invention of FIG. 1, shown installed on a schematic representation of a vehicle; and also showing a showing a perspective of the embodiment of coupling illustrated in FIGS. 17, 18, and 19.
Figure 22:
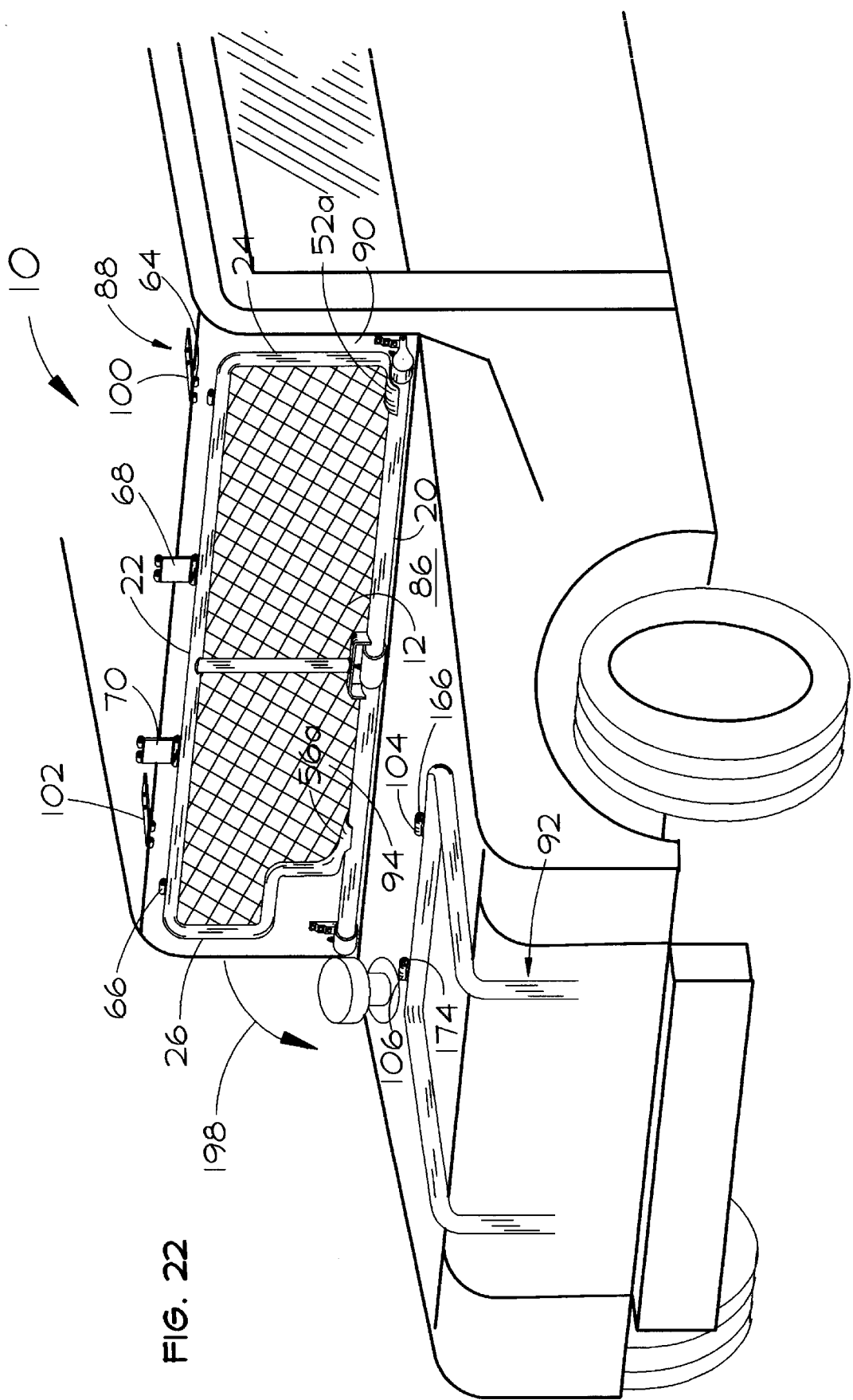
FIG. 22 is a reduced scale perspective view of the embodiment of the invention of FIG. 2, shown installed on a schematic representation of a vehicle having a snorkel member vertically disposed over the hood area of a vehicle; and also showing a perspective of the embodiment of coupling illustrated in FIGS. 14, 15, and 16.
Figure 23:
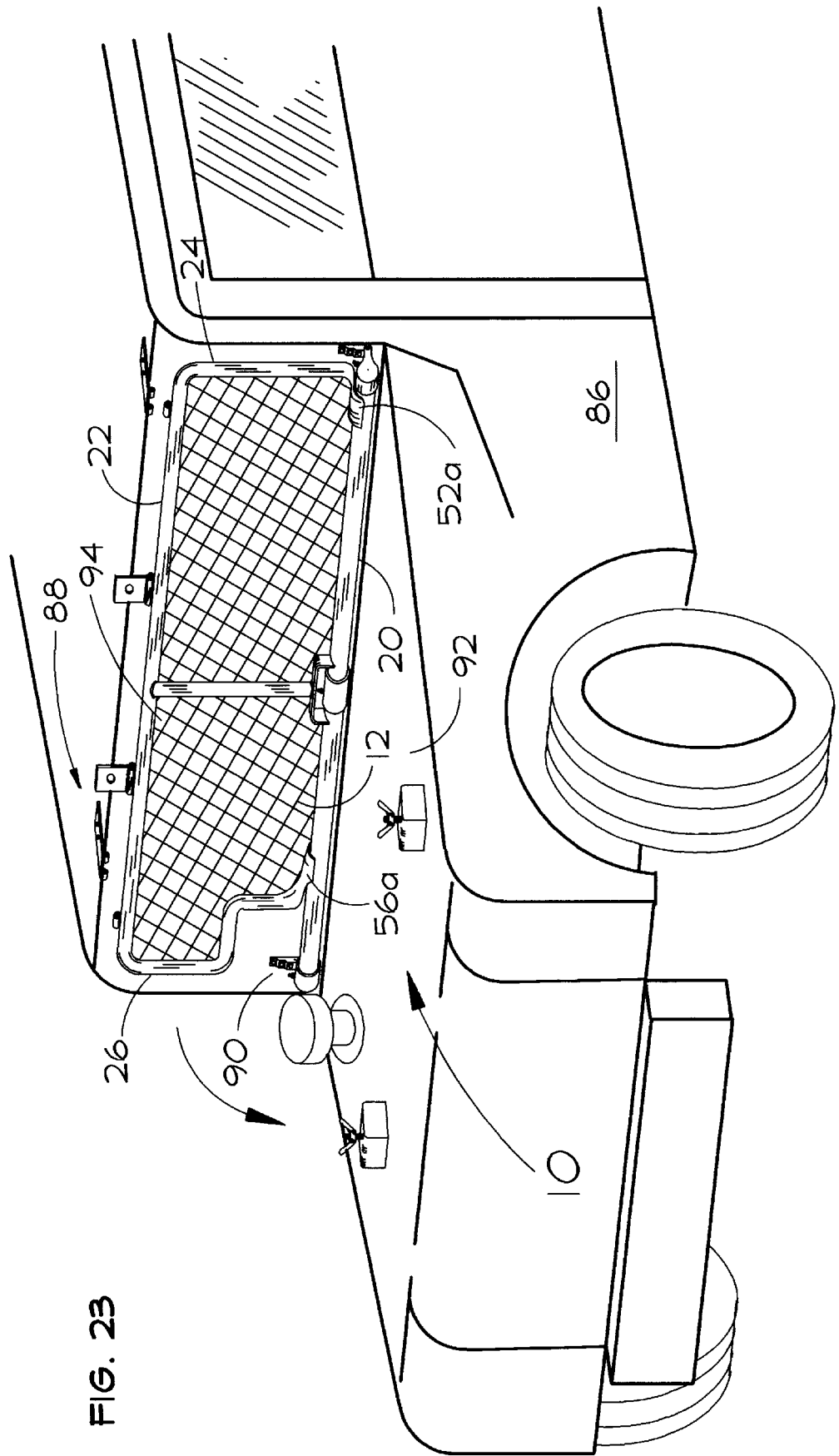
FIG. 23 is a reduced scale perspective of the embodiment of the invention of FIG. 2, shown installed on a schematic representation of a vehicle having a snorkel member vertically disposed over its hood area; and also showing a perspective of the embodiment of coupling illustrated in 17, 18, and 19.
Figure 24:
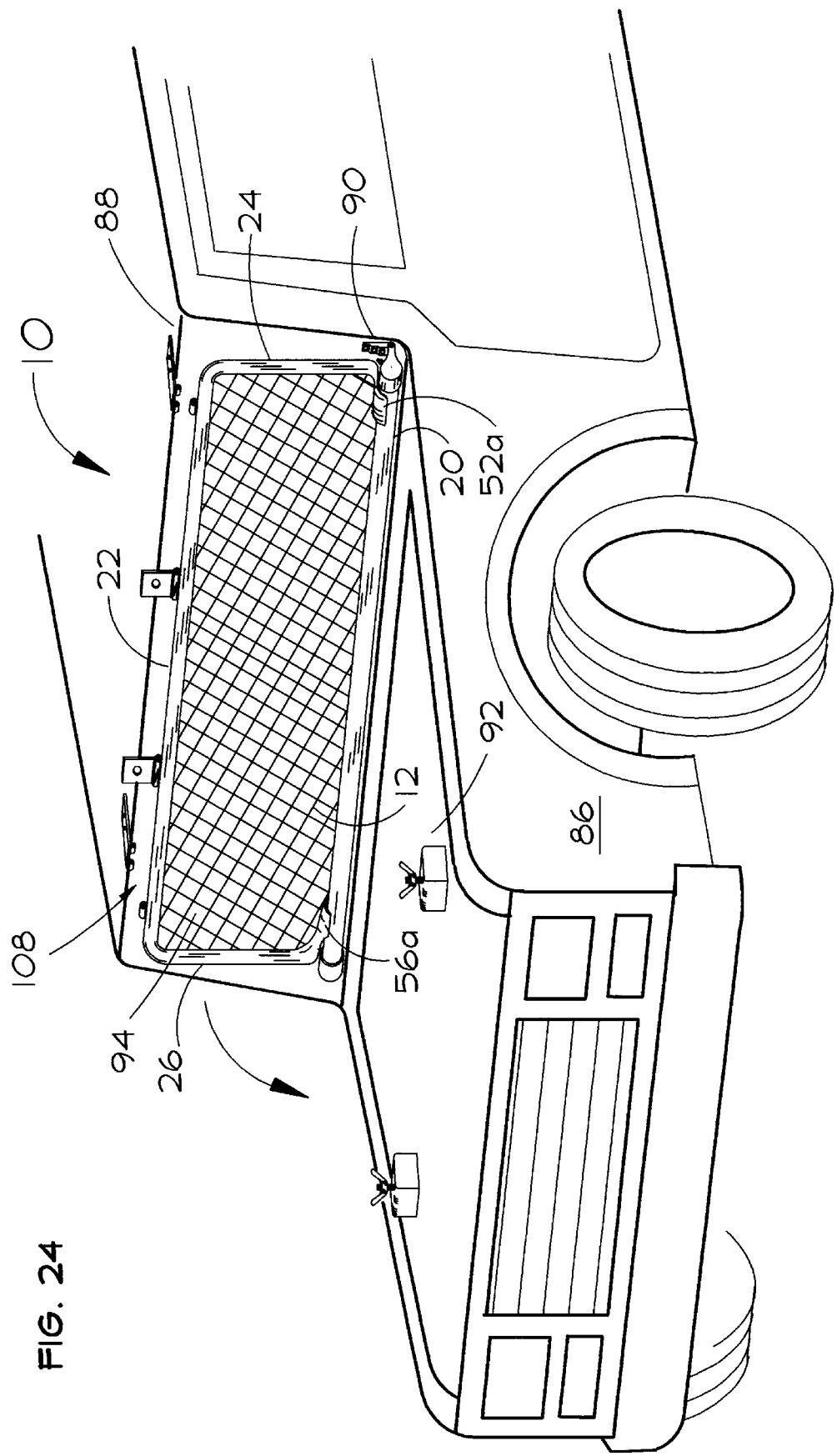
FIG. 24 is a perspective view of another embodiment of the invention shown installed on a schematic representation of a jeep-type vehicle; and also showing a perspective of the embodiment of coupling illustrated in FIGS. 17, 18, and 19.
Figure 25:
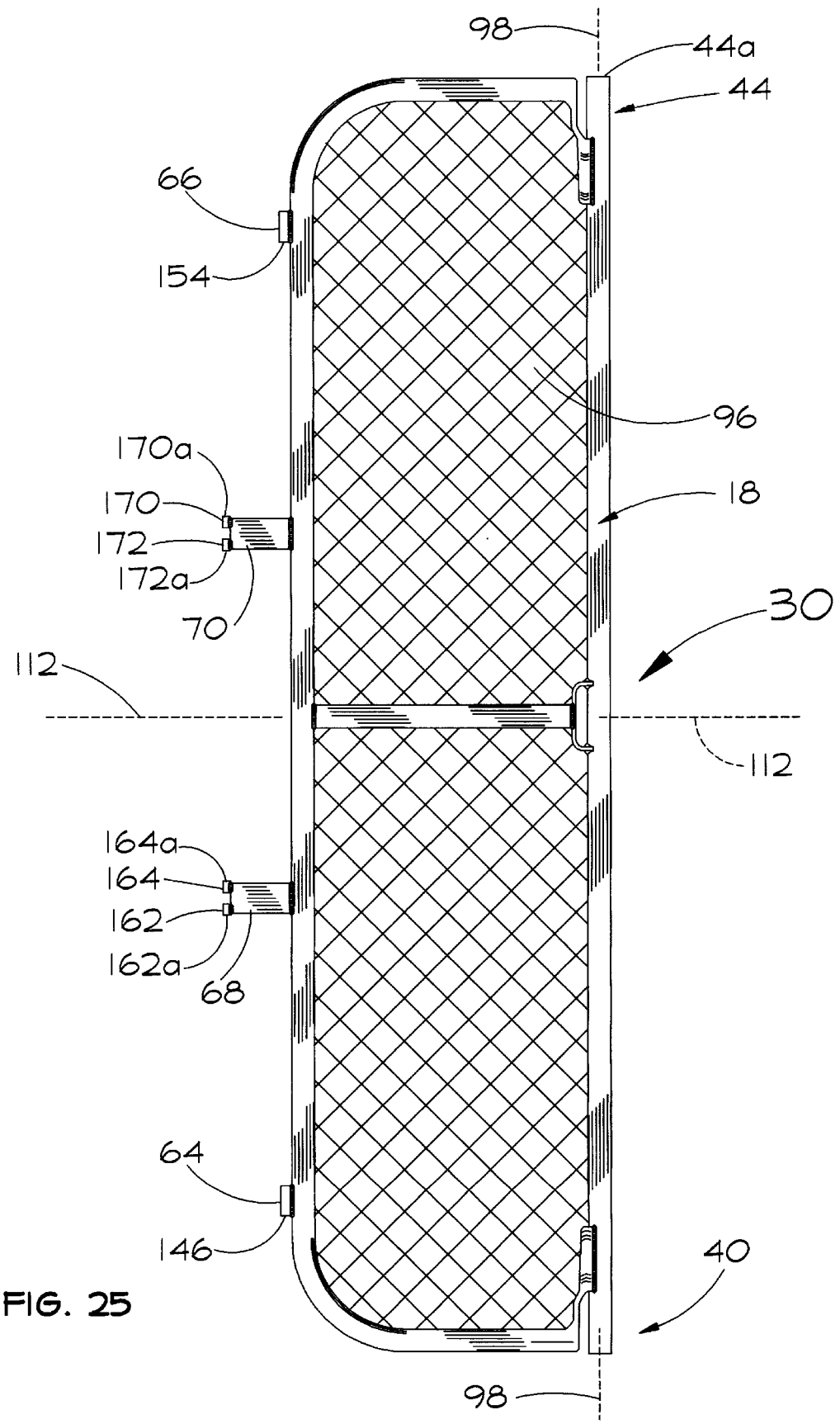
FIG. 25 is a front view similar to FIG. 1, illustrating the assembly of the present invention without hinge members attached thereto.
Figure 26:
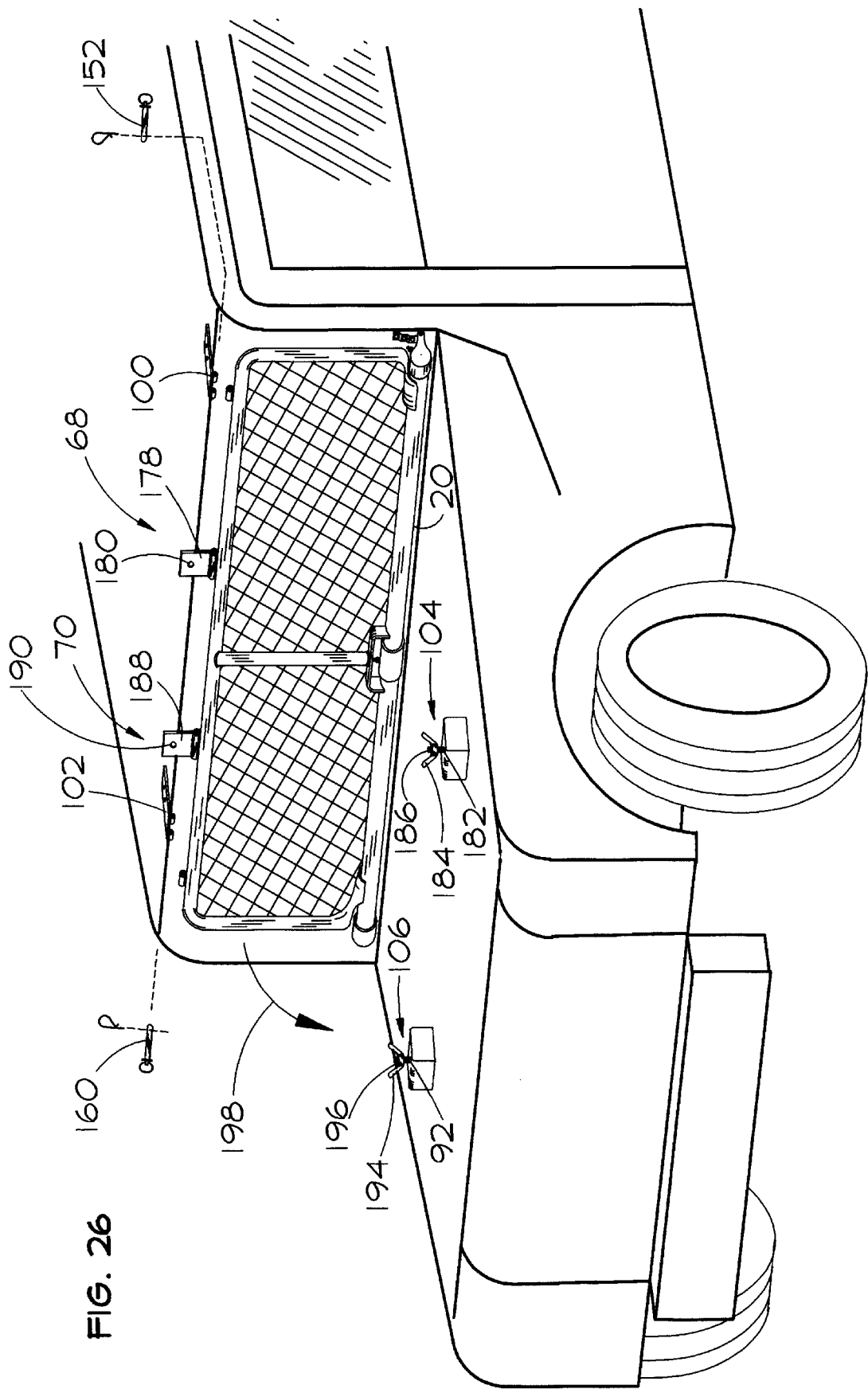
FIG. 26 is a perspective view similar to FIG. 21, illustrating the pin members utilized in one embodiment of the invention to secure the assembly in one of a plurality of serviceable positions.
Figure 27:
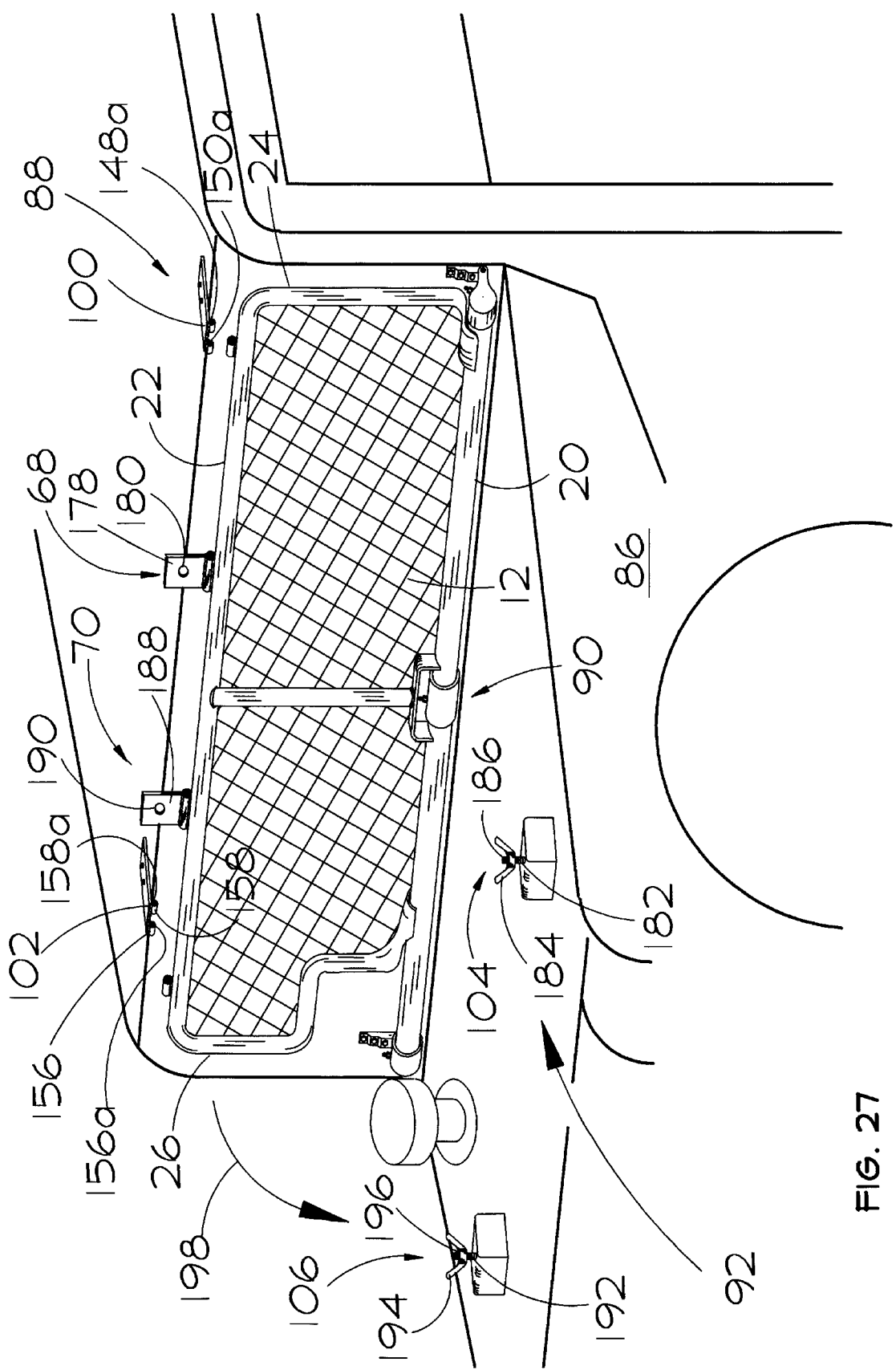
FIG. 27 is an enlarged scale view of FIG. 23, illustrating additional elements in more detail.
Figure 28:
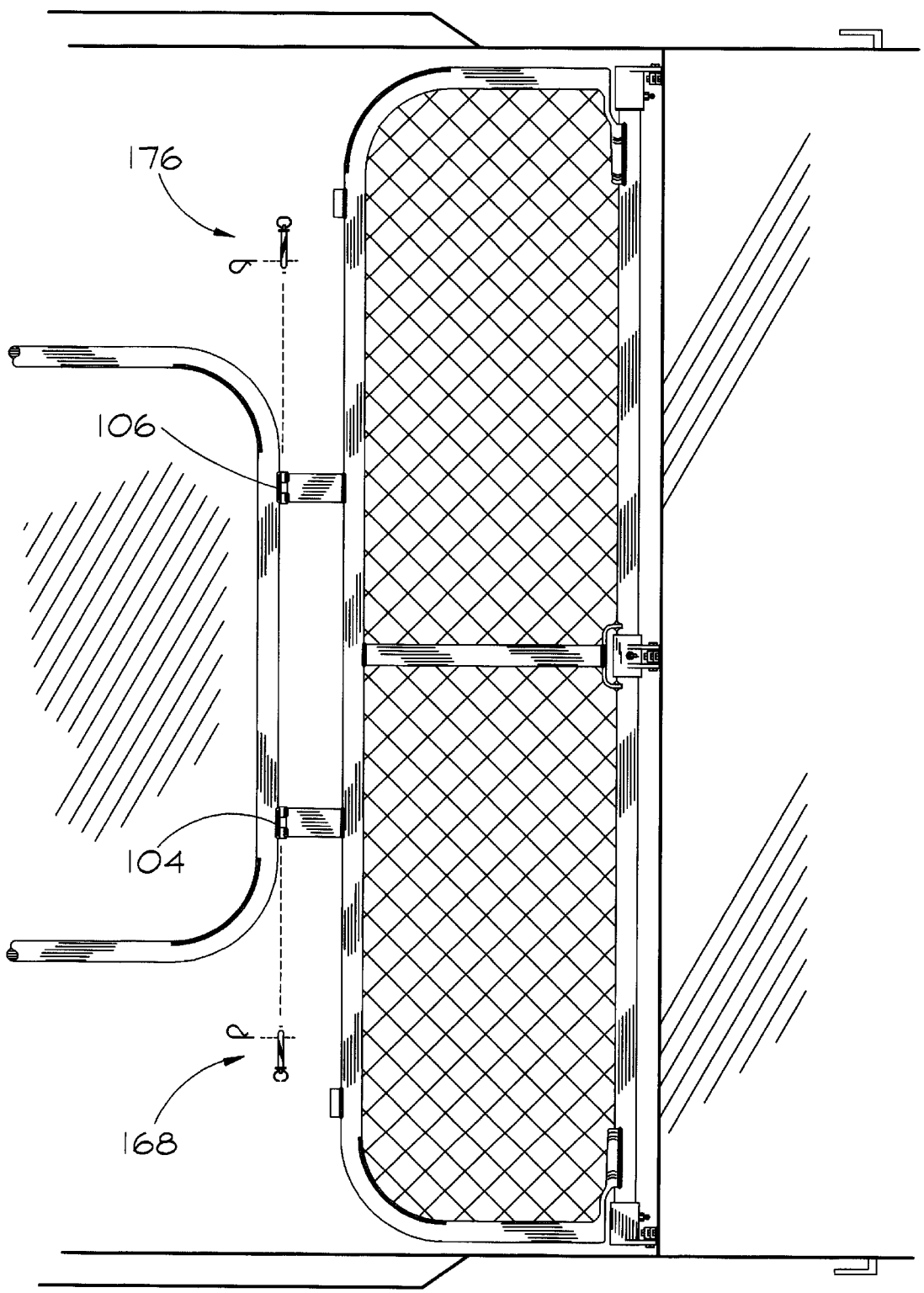
FIG. 28 is a reduced scale view similar to FIG. 3, illustrating pin members utilized in one embodiment of the invention to secure the assembly in another position different from that illustrated in FIG. 26.
Figure 29:
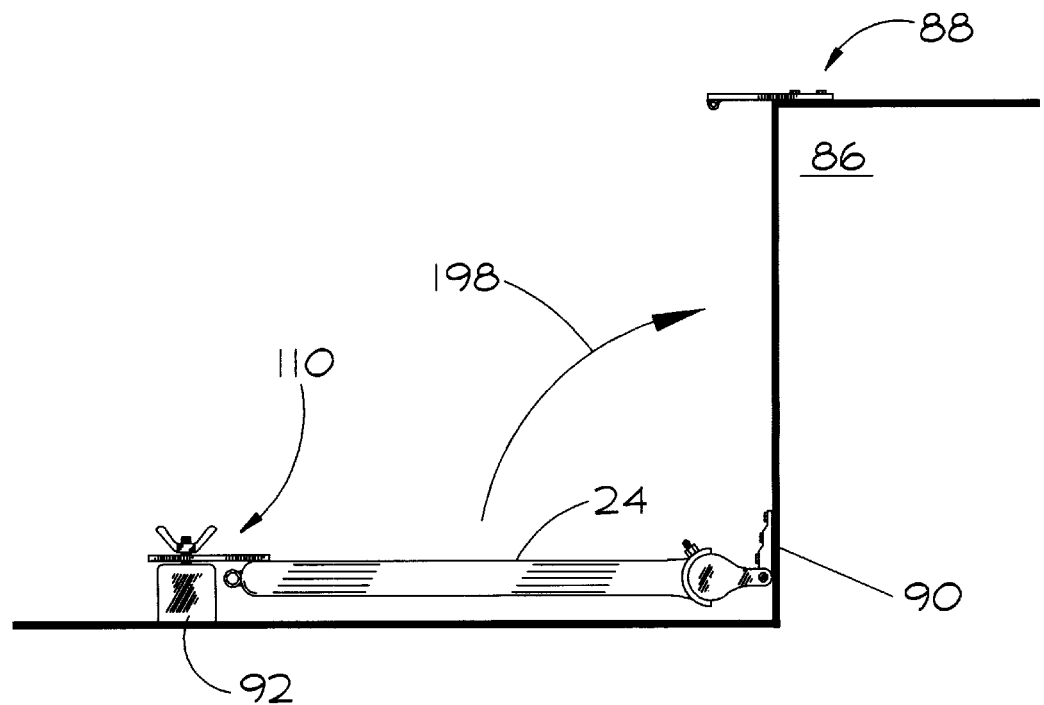
FIG. 29 is an enlarged scale view of FIG. 17 to show greater detail.

Therefore, as indicated in part earlier, in this embodiment, the support frame 18 can be pivotally moved and positionally secured in the first position 108, using the first and second coupling members 64 and 66, and the first and second coupling mates 100 and 102, respectively; to protect, cover or juxtapose the windshield 94 of vehicle 86; as illustrated in FIGS. 16, 19 and 20. And the frame 18 can be pivoted and positioned in the second position 110, using the third and fourth coupling members 68 and 70, and the third and fourth coupling mates 104 and 106, respectively; to protect, cover or juxtapose the third support area 92 and to act as a support surface over or adjoining area 92; as illustrated in FIGS. 3, 14, and 17.

In this preferred embodiment, the first support area 88 is in the form of a roof area on a vehicle; the second support area 90 is in the form of a lengthwise or horizontal, or sloped, surface support area adjacent, proximate or adjoining the windshield 94 of vehicle 86; and the third support area 92 is in the form of a hood, front portion, nose, engine cover, or rear portion, juxtaposed or adjoined to a window portion, or other surface portion needing protection or coverage.

It will be recognized that it is also within the scope of the invention to provide other coupling and corresponding coupling mate means located on the same or different support surfaces on a vehicle or other surfaced member or device, in reference to which the support frame 18 is pivoted or positioned and secured. Also the vehicle 86, along with the other types described earlier, can take the form of an aerospace or other type of rocket, jet, space shuttle, or air or space-flight vehicle, or interplanetary vehicle, with which the assembly 10 can be used, combined or installed.

The assembly 10 is also designed within the spirit of the invention to be used, installed or connected to adjoining surfaces of mining and underground vehicles and rail cars, surface railroad engine locomotives and other railway cars, and various diverse types of farm, excavating and construction tractors, trucks and equipment; and various machinery and devices related to each of these uses.

Additionally, in a preferred embodiment of the invention the third hinge 72 is securely attached or connected to, or installed on, the second support surface 90 of vehicle 86 in a location where it is positioned substantially or generally equidistant between the first hinge 60 and the second hinge 62. The hinge 72 is coupled or operatively connected to an adjacent portion of the support frame 18, in this location or position, so that it can support and provide pivotal or rotational movement to this portion of the frame 18. In its connected or coupled and installed position, the hinge 72, in a preferred embodiment, defines or is provided with at least the first end portion 74 in the form of a first side portion, and the second end portion 76 in the form of a second side portion. The portions 74 and 76 are generally or substantially located and positioned on the axial plane 98 of the first and second end portions 40a and 44a of the first and second hinge extensions 34 and 36, respectively. Also, in this embodiment, the third widthwise portion 78 is in the form of an auxiliary support frame member having the first and second connection ends 80 and 82, connected as earlier indicated herein. However, in this embodiment, the second connection end 82 is preferably attached along the axis 112 which is generally perpendicular to the axial plane 98, of the end portions 40a and 44a, of the hinge extensions 34 and 36.

In a preferred embodiment of the invention each of the first and second hinges 60 and 62 is provided with or defines the installation channel 114 and 116, respectively, each of which extends within the hinge. In this embodiment one end of the channel 114 is the open channel portion 118 and its opposite end is the stop-support wall 120; and one end of the channel 116 is the open channel portion 122 and its opposite end is the stop-support wall 124. The channel 114 houses and pivotably or movably supports the first hinge extension 34, and the channel 116 houses and pivotably or movably supports the second hinge extension 36.

The third hinge 72 is provided with or defines the through-channel 126 extending within the hinge 72 its entire length so that the through-channel 126 is hollow throughout, having openings at both its first and second end portions 74 and 76. Adjacent portions of the support frame 18 extend through and are housed and supported by the through-channel 126; as illustrated generally in FIGS. 3 and 6.

Additionally, in a preferred embodiment, each of the first, second, and third hinges 60, 62, and 72 have and define a port hole 128, 130, and 132, respectively. Each of the port holes 128, 130, and 132 is positioned on the respective hinge at a location, in a preferred embodiment, where it is spaced, or a distance, from the second support area 90 of vehicle 86, so as not to be impeded or covered by this surface. In this embodiment, each of the hinges 60, 62, and 72 is provided with a lubrication port member 134, 136, and 138, respectively. Each of these lubrication port members is threadably or otherwise attached or connected to each of the respective port holes 128, 130, and 132 of each respective hinge 60, 62, and 72. By this structure of the invention each of the hinges 60, 62, and 72 can be supplied with various forms of lubrication to enhance pivotal movement or rotation of installed, adjacent portions of the support frame 18.

As indicated in part earlier herein, the guard and support member 12 can be constructed as a wire mesh member from resilient metal fence material or other similar metal constructive material. The guard and support 12 can also be constructed, in a preferred embodiment, of a resilient mesh-like polymer or plastic material, composite plastic and alloy materials, and other types of strong mesh material or solids.

Figure 2:
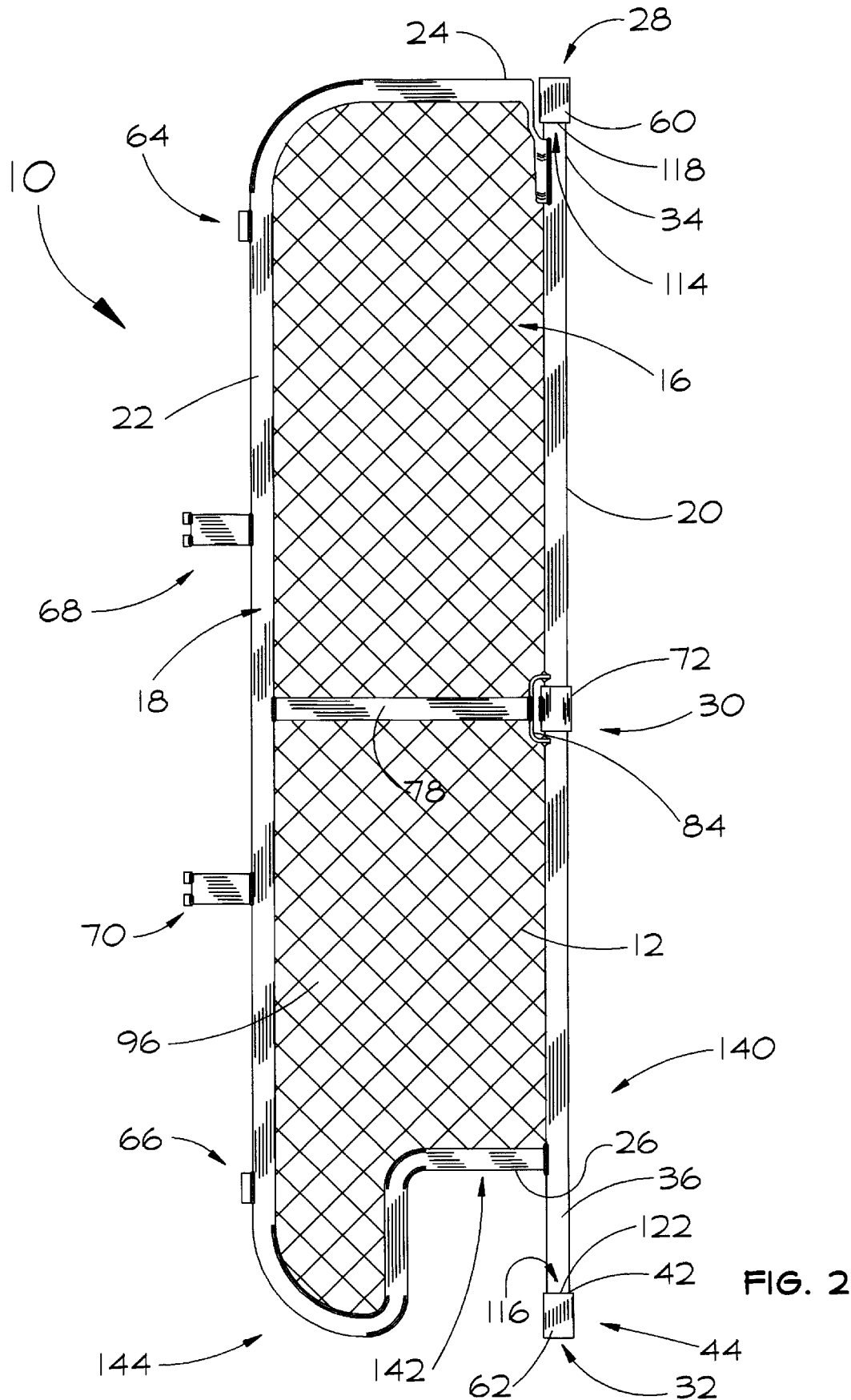
FIG. 2 is a back view of another preferred embodiment of the novel windshield protection guard and combination support surface assembly of the present invention.

In a preferred embodiment the support frame 18 is generally, or at least partially, rectangular in appearance and configuration, when viewed from the front or back, as illustrated in FIGS. 1, 2, and 3. In this embodiment the frame 18 is provided with one (1) to four (4) rounded corners. And in this form the axial plane 98 of end portions 40a and 44a, of outboard portions 40 and 44, of the first and second hinge extensions 34 and 36; respectively; compose, constitute and make up the base portion of a generally rectangular, frame 18.

Also, in another embodiment and configuration, the support frame 18 is provided having a first configurational portion 140 and a second configurational portion 142.

The first configurational portion 140 is generally, or substantially, rectangular in shape or appearance, when viewed from the front or back views; as illustrated in FIG. 3. In this embodiment the second configurational portion 142 having two sides parallel to one another meeting or connecting with two sides of the first configurational portion 140. The portion 142 has a third side which is generally, positionally perpendicular to each of its first two sides; and a fourth, side portion 144 which is cantilevered or similarly formed, or having a spaced area with an adjacent projecting section. This embodiment is employed to be utilized in a third support area 92 having a projecting vertical object thereon or like object or member, so that the spaced portion of the cantilevered side 144 can easily clear and be spaced around, or adjoining without touching, a vertically, or otherwise, projecting object or member, when the support frame 18 is pivotally secured in the second position 110; as generally illustrated by example in FIGS. 2, 14, 17, 22, and 23.

Additionally, as indicated in part earlier herein, and illustrated, the support frame 18, in one preferred embodiment, is quadrilateral in configuration in its appearance from front or back views; and is provided so as to have or define the cantilevered portion 52a, attached inboard of the first hinge extension 34; and a further, cantilevered portion 56a attached inboard of the second hinge extension 36, in this embodiment; as illustrated in FIGS. 1, 3, 12, and 20 through 24.

In one preferred embodiment of the invention the first coupling 64 has or defines the installation pin aperture 146, which is a channel or hole which extends internally within this coupling for its entire dimension, with openings from this coupling on either side. The first coupling mate 100 is provided with first and second coupling elements 148 and 150. These elements 148 and 150 are spaced, or a distance, from one another to create a space or channel between them, and are oriented or constructed to contain, define or provide a pin securement aperture, 148a and 150a, respectively. The elements 148 and 150 are positioned or aligned in such a way that they present each of the apertures 148a and 150a in registered or axial alignment with one another, generally or substantially along the same plane. By so doing, the coupling 64, in this preferred embodiment, is intended to fit between the coupling elements 148 and 150 of the first coupling mate 100 when the support frame 18, and assembly 10, is moved to the first position 108; as illustrated in FIGS. 16, 19, 20, and other drawings presented herein. When placed in the first position 108, as indicated, the installation pin aperture 146 of coupling 64 is, then, preferably registered, and placed in general axial alignment with both of the pin securement apertures 148a and 150a, for coupling together. The coupling mate is also provided with the pin securement member 152. The member 152 is slid, or otherwise inserted, through the registered installation pin aperture 146 and the pin securement apertures 148a and 150a, when the support 18 is in the first position 108 and the coupling 64 and mate 100 are aligned as described and illustrated, to secure and couple 64 and 100 so that they are connected together. The securement member 152 can then, preferably, be detached or released from its coupling position to free the support frame 18 for movement to another position in keeping with the spirit of the invention and assembly 10.

In like manner, the second coupling 66 has the installation pin aperture 154, a channel which extends internally within coupling 66 for its entire dimension with openings on each peripheral margin of its dimension. Also, the second coupling mate 102 has first and second coupling elements 156 and 158, which are spaced, or a distance, from one another to create a space or channel between them. The elements 156 and 158 have the pin securement apertures 156a and 158a, respectively. The elements 156 and 158 are positioned in such a manner that they present each of the respective apertures 156a and 158a in registered or general axial alignment with one another. In this manner, the coupling 66 fits between, or seats within, the coupling elements 156 and 158 of the second coupling mate 102, when the support frame 18 is moved to the first position 108, as heretofore cited by illustration. When placed in the first position 108 the installation pin aperture 154 of coupling 66 is then registered, and placed in general axial alignment with, both of the pin securement apertures 156a and 158a, for coupling and securement together. The coupling mate 102 is also provided with the pin securement member 160. The member 160 is slid, or otherwise inserted or installed through the registered installation pin aperture 154 and the pin securement apertures 156*a* and 158*a* when the support 18 is in the first position 108 and coupling 66 and mate 102 are aligned as described and illustrated, to secure and couple 66 and 102 so that they are securely connected together. The securement member 160 can then be detached or released from its coupling position to free the support frame 18 for movement to another position.

It will be understood that either of the pin securement members 152 and 160 can be provided in a number of releasable and detachable configurations and structure to couple or bind each of the respective couplings 64 and 66 and each of the respective mates 100 and 102.

Also, in a preferred embodiment of the invention and assembly 10, the third coupling 68 is provided or constructed in the form of the first coupling element 162 and the second coupling element 164. The elements 162 and 164 are spaced, or a distance, from each other to create a channel, space or hole between them. The coupling element 162 has, or defines, the pin securement aperture 162*a* and the coupling element 164 has, or defines, the pin securement aperture 164*a*, each of which is in general or substantial axial or registered alignment with one another. The third coupling mate 104 has, or defines, the installation pin aperture 166; and is also provided with the pin securement member 168. When the support frame 18, or assembly 10, is pivoted or moved for securement to the second position 110; the mate 104 is positioned between the first and second coupling elements 162 and 164 of the third coupling 68 to register the installation pin aperture 166 with the pin securement apertures 162*a* and 164*a* of the coupling 68. The pin securement member 168 is slid, inserted, installed or otherwise engaged in the apertures 162*a*, 166, and 164*a*, to couple or secure the coupling 68 and the mate 104, to secure the support frame, or that portion of the frame, in the second position 110; as illustrated by example in FIGS. 3, 14, and 17.

The fourth coupling 70 is provided or constructed in the form, in one preferred embodiment, having a structure composed of the the first coupling element 170 and the second coupling element 172. These elements 170 and 172 are spaced, or a distance, from each other to create a channel, space or hole between them. The coupling element 170 has, or defines, the pin securement aperture 170*a*, extending the length or dimension of the element 170, and having openings of the aperture 170*a* at either side of the element 170's dimension. The coupling element 172 has, or defines, the pin securement aperture 172*a*, extending the length or dimension of the element 172, and having openings of the aperture 172*a* at either side of the element's 172's dimension. Each of the apertures 170*a* and 172*a* is constructed or supported as a part of the respective element 170 and 172, so that these apertures are in general or substantial axial or registered alignment with each other, therefore, lying on the same general axial plane with each other. The fourth coupling mate 106 has, or defines, the installation pin aperture 174, which is a hole, channel, space or aperture which extends the length or dimension of the mate 106 and has exit openings on either side of this length or dimension. The mate 106 is provided with the pin securement member 176.

When the support frame 18, or assembly 10, is pivoted or moved for securement to the second position 110; the mate 106 is positioned between the first and second coupling elements 170 and 172 of the fourth coupling 70 so as to register the installation pin aperture 174 with the pin securement apertures 170*a* and 172*a* of the coupling 70. The pin securement member 176 is slid, inserted, installed or otherwise engaged in the apertures 170*a*, 174, and 172*a*, to couple or secure the coupling 70 and the mate 106, to secure the support frame 18, or that portion of the frame affected or supported, in the second position 110; also as illustrated in FIGS. 3, 14, and 17, of the drawings.

In another preferred embodiment of the invention, the assembly 10, is provided with the third coupling 68 having a plate member 178, which can take the form of many different configurations and structural orientations, but is preferably a square-like, or rectangular-like, flat plate or surface. The plate 178 has or defines the stud-hole 180. In this embodiment the third coupling mate 104 is provided with the threaded stud member 182, which can be any of a diverse number of supra-surface, projecting or vertically disposed, threaded pin, screw, yoke, or bolt, or other above-surface attachment/installation member. The stud member 182 is positioned on the third support surface 92, and the third coupling 68 on the support frame 18, so that when the support frame 18 is moved or positioned to the second position 110, the stud-hole 180 aligns, registers, and fits onto the stud member 182; as illustrated, by example, in FIGS. 17, 18, 19, 21, 23, and 24, among other drawings.

The mate 104, in this embodiment, is also provided with the handle-wing nut member 184, which has or defines a threaded installation hole 186. The handle-wind nut 184 can take a number of different configurations and structure having handle, turning means, extending or projecting portions, or wing-like sections, and being provided with a nut-like threading around which such sections or portions are concentrically supported or positioned, or otherwise disposed or positioned to provide torque when moved in relation to the hole 186.

In this embodiment the threaded installation hole 186 of the handle-wing nut 184 of the third coupling mate 104 is threadably installed or engaged on the threaded stud member 182 of the mate 104 to biasably, or through pressure of turning torque, secure, and/or press, the plate member 178 of coupling 68, by aligned or registered guiding of the stud hole 180 of plate 178, fitted on the stud member 182, on to the stud 182 of the of mate 104; when the support frame 18 is moved to and secured at the second position 110.

In this preferred embodiment the fourth coupling 70 is in the form of a plate member 188; and, as with the case of plate member 178, can have many configurations; but is preferably square or rectangular-like, or elliptical or circular in shape, when viewed from the top or bottom, generally. The plates 178 and 188 are illustrated, by example, in FIGS. 17–19, 21 –23, as substantially rectangular or square-like in configuaration. The plate 188, in like manner in relation to plate 178, has a stud-hole 190. The fourth coupling mate 106 has a threaded stud member 192; which, as indicated with respect to stud 182, can be of a diverse number of supra-surface, or articulated, types. The stud member 192 is positioned and installed on the third support surface 92, and the fourth coupling 106 is positioned and connected on the support frame 18, in a positional manner and orientation so that when the frame 18 is moved or pivotally positioned to the second position 110 the stud-hole 190 aligns, registers, and fits, on, or proximally adjoins, the stud member 192; as illustrated in FIGS. 17–19, 21, and 23–24, and other drawings.

The mate 106 in this embodiment is provided with the handle-wing nut member 194, which has threaded installation hole 196. As in the case of nut member 184, the nut member 194 can take a number of configurations and structure, and its relation to structurally and functionally providing torque, when engaged, to its hole 196.

In this embodiment, as in the case of wing nut 184, the threaded installation hole 196 of the wing nut 194 of the fourth coupling 106 is threadably, or otherwise, installed or engaged on the threaded stud member 192 of the mate 106, once the stud hole 190 is aligned, registered, fitted, proximally adjoined with, or otherwise situated positionally in reference to the stud member 192; to biasably, or through threaded pressure, turning torque, or otherwise; secure, or/and press the plate member 188 of coupling 70 onto the stud 192 of mate 106, and position the plate 188 to the lower, or lowermost, portion or supporting surface, of the stud 192 and mate 106; when the support frame 18 is positioned and secured to the second position 110.

It will be understood that it is within the scope and spirit of the teaching of the present invention to provide the first, second, third and fourth coupling members 64, 66, 68, and 70, respectively; and the first, second, third and fourth coupling mates 100, 102, 104, and 106, respectively; in a number of other connecting, coupling, attaching, and/or articulating-disarticulating, releasable/detachable, or integral, structural forms and configurations; as also is the case with regard to the first, second and third hinges 60, 62, and 72. It will also be understood that these members can be constructed from a diverse number of graphite, metal or metal alloy, laminate, steel, polymer, and other diverse types of material or constructive components, as well as a plurality of resilient and weatherproof substances and components. The other parts and members of the assembly 10, such as the guard and support 12 and the support frame 18 can likewise be constructed of varied constructive materials. However, in one preferred embodiment, the guard 12 is constructed from metal or fence-like, or wire/polymer material; and the support frame 18 is constructed from resilient, strong or and/or heavy metal alloy, or steel material.

In another preferred embodiment of the present invention and assembly 10, a windshield protection guard and combination support surface assembly of the invention is provided for use on a vehicle 86 having a windshield 94; and where the first, second, and third, support areas 88, 90, and 92, respectively; are provided in the form for applicable use and installation of the invention, of a roof area, support area adjacent to the windshield, and a hood area, respectively, of the vehicle 86.

In this embodiment, the guard and support member 12 has front and back sides and is generally quadrilateral in configuration and shape when viewed from the front and back sides; as indicated, generally by representative examples, in FIGS. 1–3, and 20–24.

The first hinge 60 in this embodiment is attached or connected to second support area 90; which, in this case, by functional application, is the support area adjacent to the windshield, adjacent to or just below the windshield 94, of a vehicle 86. The second hinge 62 is attached, also, to the support area adjacent to the windshield, in a spaced relationship in reference to the first hinge 60.

In this embodiment, the frame 18 is pivoted, positioned, or moved, along an arcuate positional course, channel or path of movement, when pivotably connected or coupled with each hinge extension 34 and 36 being installed in each respective hinge 60 and 62. With such securement and arcuate positional course; as illustrated by representative example in FIGS. 8, 9, and 14–24; by general arcuate positional course 198 arrow in these drawings; the guard and support 12 and frame 18, when secured to one another, define or have the configurational orientation when viewed from the side, at different pivotal positions, of generally representing a dihedral angle 200 in reference or relation to the windshield 94 and/or the third support area 92, which is in this case in the form of a hood area, of a vehicle 86.

In this embodiment, each of the first, second, third and fourth coupling members 64, 66, 68, and 70, respectively; and the first, second, third and fourth coupling mates 100, 102, 104, and 106, respectively; is positioned, and attached or connected, to their respective, earlier indicated point or areas; so that each is located generally, substantially or proximally adjoining in functional position the arcuate positional course 198 of movement as described. When so positioned, in this embodiment, the second lengthwise side 22 of the frame 18 is pivotally positioned, substantially along the arcuate positional course 198, to the first position 108 and secured at this position as earlier set forth herein, for protecting and covering the windshield 94 of a vehicle 86; and the side 22 of the frame 18, when properly hinge-secured as earlier described, can be pivotally positioned or moved substantially along the arcuate positional course 198 to the second position 110, and secured as earlier set forth, for covering the hood area, or third support area 92 of a vehicle 86, and providing over or adjacent to such an area, a support surface protecting or serving this area.

Figure 30:
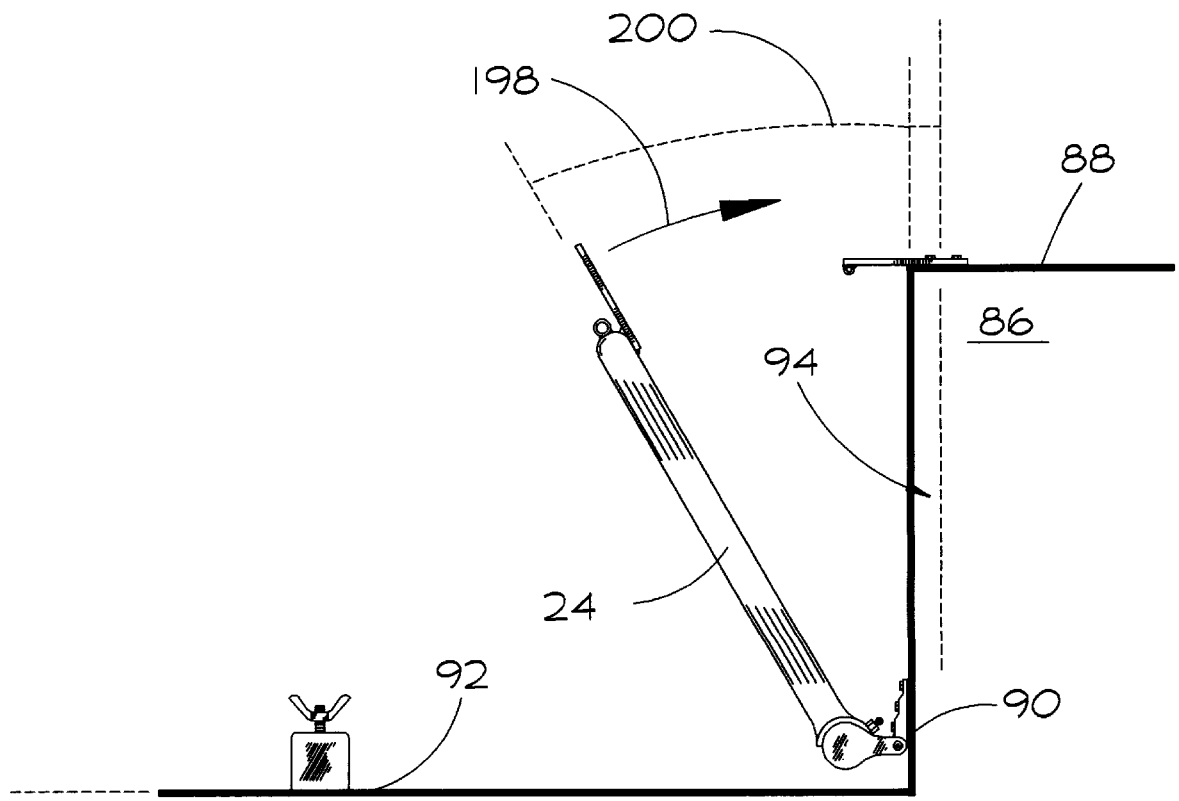
FIG. 30 is an enlarged scale view of FIG. 18 to show greater detail.

FIGS. 25 through 30, illustrate in further detail, elements previously discussed in this specification; including, by representational broken lines in FIG. 30, one of many available dihedral angles 200, and the encompassed positional relationship that the assembly can take in preferred embodiments in relation to the first support area 88, the second support area 90, and/or the third support area 92; as also illustrated and discussed herein in relation to FIGS. 8, 11, 15, and 18.

Additionally, FIGS. 3, 4, 5, 6, 7, 8, 11, 12, 13, 14, 15, 16, 17, 18, 19, 20, 21, 22, 23, 24, 26, 27, 28, 29, and 30, illustrate preferred examples, only, of a diverse number of hinge attachment means or connections 202, which are and can be utilized to couple, attach, or connect, the first hinge 60, the second hinge 62, and/or the third hinge 72 to the second support area 90 or another portion or section of a diverse number of different types of vehicles embraced in the breath of the specification. Many different types of means or connections 202 can be utilized including, but not limited to, bolted members, as illustrated by example, solid welded portions, riveted portions or members, various releasably secured or coupled attachments; and other diverse and varied ways or means for coupling, securing, attaching, connecting, or otherwise adjoining the hinges 60, 62, and/or 72 to a selected support, installation and/or attachment surface.

The dihedral angle angle 200, discussed just above, also serves as a positional relationship of the assembly 10, and/or the guard and support 12 and the support frame 18 thereof, in relation to an existing, windshield 94; in addition to the first, second, and/or third support areas 88, 90, and/or 92, previously discussed herein, in preferred embodiments of the present invention.

Accordingly, the appended claims are intended to cover all such changes and modifications as falling within the true scope and spirit of the present invention. The reader is requested to determine the scope of the invention by the appended claims and their legal equivalents, and not by the examples which have been given.

What is claimed is:

1. A windshield protection guard and combination support surface assembly, comprising:

a guard and support member, having first and second sides;

a support frame member, having first and second lengthwise side members and first and second widthwise portion members;

said first lengthwise side member having a first end, a middle portion, and a second end, having at the first end thereof a first hinge extension member, and having at the second end thereof a second hinge extension member, each of the first and second hinge extension members having an inboard portion and a outboard portion, the second lengthwise side member having a first end portion, a middle portion, and a second end portion, the first and second widthwise portion members, each, having first and second ends, the first end of the first widthwise portion member being attached to the first end of the first lengthwise side member such that it adjoins, without touching, the inboard portion of the first hinge extension member, and the second end of the first widthwise portion member being attached to the first end portion of the second lengthwise side member, the first end of the second widthwise portion member being attached to the second end of the first lengthwise side member such that it adjoins, without touching, the inboard portion of the second hinge extension member, and the second end of the second widthwise portion member being attached to the second end portion of the second lengthwise side member, such that when the first and second widthwise portion members are attached to the first and second lengthwise side members, the support frame member substantially defines the perimeter of the guard and support member, with each of said first and second hinge extension members of the first lengthwise side member extending free and outboard of the respective attachment of the first and second widthwise portion members;

first hinge means, attached to the first hinge extension member of said first lengthwise side member of said support frame member, for securably supporting, and allowing rotational movement of, the first hinge extension member, and second hinge means, attached to the second hinge extension member of said first lengthwise side member of said support frame member, for securably supporting, and allowing rotational movement of, the second hinge extension member;

first coupling means, attached proximal and adjacent to the first end portion of the second lengthwise side member of said support frame member, for securement to a attachment site;

second coupling means, attached proximal and adjacent to the second end portion of the second lengthwise side member of said support frame member, for securement to a attachment site;

third coupling means, attached to the middle portion of the second lengthwise side member of said support frame member, spaced from and opposite to the first coupling means, for securement to a attachment site; and fourth coupling means, attached to the middle portion of the second lengthwise side member, spaced from said third coupling means, and spaced from and opposite to said second coupling means, for securement to a attachment site.

2. The windshield protection guard and combination support surface assembly of claim 1, wherein, said support frame member further comprises a third hinge means, having first and second end portions, attached along the middle portion of the first lengthwise side member of said support frame member, for securably supporting, and allowing rotational movement of, the middle portion of said first lengthwise side member; and a third widthwise portion member, having first and second connection ends, the first connection end having means for attaching the third widthwise portion member to the middle portion of said first lengthwise side member such that it is spaced and adjacent to each of the respective first and second end portions of said third hinge means, said first connection end of said third widthwise portion member, thereby, being so attached to the middle portion of said first lengthwise side member; the second connection end of said third widthwise portion member being attached to the middle portion of said second lengthwise side member and further being attached to said guard and support member;

and wherein, the first end of the first widthwise portion member defines and has a cantilevered portion having a projecting member, said projecting member being attached to the first end of the first lengthwise side member such that it adjoins, without touching, the inboard portion of the first hinge extension member; and the first end of the second widthwise portion member defines and has a cantilevered portion having a projecting member, said projecting member being attached to the second end of the first lengthwise side member such that it adjoins, without touching, the inboard portion of the second hinge extension member.

3. A protective windshield guard and combination support surface assembly, for use in combination with a vehicle having at least first, second, and third support areas adjacent to a windshield, for use when installed and secured in relation to the support areas, in a first position adjoining the first support area for protection of the windshield; and for use, in a second position, adjoining the third support area as a support surface covering the third support area of the vehicle; said assembly comprising:

a wire mesh member;

a support frame member, being fixedly attached to said wire mesh member, and forming the perimeter thereof, said support frame member having at least a first hinge extension member and a second hinge extension member, each extending free and outboard of said wire mesh member and having an end portion thereof, said end portions substantially defining an axial plane upon which they are positioned;

at least a first coupling means, attached to said support frame member, positioned opposite of and proximal to the end portion of the first hinge extension member; and a second coupling means attached to said support frame member, positioned opposite of and proximal to the end portion of the second hinge extension member;

at least a third coupling means, attached to the first support area of the vehicle, for positionally mating with said first coupling means and for releasable securement therewith; and a fourth coupling means, attached to the first support area of the vehicle, for positionally mating with said second coupling means and releasable securement therewith;

at least a first hinge support member fixedly attached, and positioned in reference, to the second support area, to mate with said first hinge extension member, the first hinge extension member being pivotally coupled and mated within the first hinge support member; and a second hinge support member fixedly attached, and positioned in reference, to the second support area to mate with said second hinge extension member, the second hinge extension member be ing pivotally coupled and mated within the second hinge support member; and at least a fifth coupling means attached to said support frame member, positioned opposite of and distal to the end portion of the first hinge extension member; and a sixth coupling means attached to said support frame member, positioned opposite of and distal to the end portion of the second hinge extension member; and at least a seventh coupling means, attached to the third support area of the vehicle, for positionally mating with said fifth coupling means and for releasable securement therewith; and a eighth coupling means, attached to the third support area of the vehicle, for positionally mating with said sixth coupling means and for releasable securement therewith;

whereby, the support frame member can be pivotally secured in a first position, utilizing the first, second, third and fourth coupling means, to protect and cover the windshield of the vehicle; and can be pivotally secured in a second position, utilizing the fifth, sixth, seventh and eighth coupling means, to cover at least part of the third support area of the vehicle and to provide a support surface thereover.

4. The protective windshield guard and combination support surface assembly of claim 3, wherein, said assembly further comprises:

a third hinge support member fixedly attached to the second support area of the vehicle, positioned substantially equidistant between the first hinge support member and the second hinge support member, said third hinge support member being supportably and pivotally coupled to an adjacent portion of the support frame member extending between the respective end portions of the first and second hinge extension members, and when so coupled, then, defining at least first and second side portions respectively facing, and substantially positioned on, the axial plane of the first and second end portions of said first and second hinge extension members.

5. The protective windshield guard and combination support surface assembly of claim 4, wherein, said assembly further comprises:

an auxiliary support frame member having first and second connection ends, the first connection end having means for attaching the auxiliary support frame member to the support frame member, spaced and adjacent to each of the respective first and second side portions of said third hinge support member, said first connection end of said auxiliary support frame member, thereby, being attached to the support frame member, the second connection end of said auxiliary support frame member being attached to a portion of said support frame member, opposite of, along an axis at an angle substantially perpendicular to, the axial plane of the end portions of said first and second hinge extension members, said auxiliary support frame member being further attached to said wire mesh member between its first and second connection ends.

6. The protective windshield guard and combination support surface assembly of claim 5, wherein, each of said first and second hinge support members defines an installation channel therewithin, such that one end is an open channel and its opposite end is a stop-support wall, each installation channel pivotably housing and supporting each of the respective first and second hinge members.

7. The protective windshield guard and combination support surface assembly of claim 6, wherein, said third hinge support member defines a through-channel, through which the adjacent portion of the support frame member extends.

8. The protective windshield guard and combination support surface assembly of claim 7, wherein, each of said first, second, and third hinge support members further defines:

a port hole positioned at a point on the respective hinge support member spaced from the second support area of the vehicle, and wherein each of said first, second, and third hinge support members further comprises:

a lubrication port member, each being attached within each of the respective port holes of each hinge support member;

whereby each of said hinge support members can be lubricated for enhanced pivotal movement of adjacent portions of the support frame member.

9. The protective windshield guard and combination support surface assembly of claim 3, wherein:

said wire mesh member is constructed from a resilient metal fence material.

10. The protective windshield guard and combination support surface assembly of claim 3, wherein:

said wire mesh member is constructed from a resilient meshy polymer or plastic material.

11. The protective windshield guard and combination support surface assembly of claim 3, wherein:

said support frame member is generally rectangular in configuration, having at least one to four rounded corners, and wherein, the axial plane of the end portions of said first and second hinge extension members constitute in such configuration the base of the support frame member generally rectangular in configuration.

12. The protective windhield guard and combination support surface assembly of claim 3, wherein:

said support frame member has a first and second configurational portion, the first configurational portion being generally rectangular in shape, when viewed from a front view, having one to two rounded corner portions; the second configurational portion having first and second sides, when so viewed, parallel to one another and concurrent in positional axis with the first configurational portion, and further having a third side generally perpendicular to each of the first and second sides, and having a fourth side portion which is cantilevered in configuration, such that when the support frame member is pivotally secured in the second position, the support frame member will adjoin, without touching, an object provided with a vehicle on the third support area.

13. The protective windshield guard and combination support surface assembly of claim 12, wherein:

said support frame member is quadrilateral in configuration, when viewed from the front thereof; and said support frame member defines and has a first cantilevered section which is attached inboard of said first hinge extension member, and a second cantilevered section which is attached inboard of said second hinge extension member.

14. The protective windshield guard and combination support surface assembly of claim 3, wherein:

the first support area of the vehicle is a vehicle roof area, the second support area of the vehicle is a support area adjacent to the windshield of the vehicle, and the third support area is a vehicle hood area.

15. The protective windshield guard and combination support surface assembly of claim 3, wherein:

said first coupling means of said assembly defines a installation pin aperture, and said third coupling means has first and second coupling elements, each defining a pin securement aperture in axial alignment with one another, and said first and second coupling elements are spaced from one another, said third coupling means also having a pin securement member, such that when the support frame member is pivotally secured in the first position, the first coupling means is positioned between the first and second coupling elements of said third coupling means to register the installation pin aperture with each of the pin securement apertures, and the pin securement member is insertably engaged within the pin securement apertures and the installation pin aperture, to releasably secure the first and third coupling means when the support frame member is in the first position.

16. The protective windshield guard and combination support surface assembly of claim 15, wherein:

said second coupling means of said assembly defines a installation pin aperture, and said fourth coupling means has first and second coupling elements, each, spaced from one another and defining a pin securement aperture in axial alignment with one another, said fourth coupling means also having a pin securement member, such that when the support frame member is pivotally secured in the first position, the second coupling means is positioned between the first and second coupling elements of said fourth coupling means to register the installation pin aperture with each of the pin securement apertures, and the pin securement member is insertably engaged within the pin securement apertures and the installation pin aperture, to releasably secure the second and fourth coupling means when the support frame member is in the first position.

17. The protective windshield guard and combination support surface assembly of claim 16, wherein:

said fifth coupling means of said assembly has first and second coupling elements, each, spaced from one another and defining a pin securement aperture in axial alignment with one another, and said seventh coupling means defining a installation pin aperture and also having a pin securement member, such that when the support frame member is pivotally secured in the second position, the seventh coupling means is positioned between the first and second coupling elements of the fifth coupling means to register the installation pin aperture with each of the pin securement apertures, and the pin securement member is insertably engaged within the pin securement apertures and the installation pin aperture, to releasably secure the fifth and seventh coupling means when the support frame member is in the second position.

18. The protective windshield guard and combination support surface assembly of claim 17, wherein:

said sixth coupling means of said assembly has first and second coupling elements, each, spaced from one another and defining a pin securement aperture in axial alignment with one another, and said eighth coupling means defining a installation pin aperture and also having a pin securement member, such that when the support frame member is pivotally secured in the second position, the eighth coupling means is positioned between the first and second coupling elements of the sixth coupling means to register the installation pin aperture with each of the pin securement apertures, and the pin securement member is insertably engaged within the pin securement apertures and the installation pin aperture, to releasably secure the sixth and eighth coupling means when the support frame member is in the second position.

19. The protective guard and combination support surface assembly of claim 16, wherein:

the fifth coupling means of said assembly has a plate member, said plate member defining a stud-hole, and said seventh coupling means has a threaded stud member, said threaded stud member being positioned such that when the support frame member is pivotally positioned to the second position, the stud-hole registers with and fits onto the stud member, said seventh coupling means also having a handle-wing nut member defining a threaded installation hole, the threaded installation hole of the handle-wing nut member of said seventh coupling means being threadably engaged upon the threaded stud member of the seventh coupling means to biasably and releasably secure the plate member of the fifth coupling means on to the threaded stud member of the seventh coupling means when the support frame member is in the second position;

and wherein:

the sixth coupling means of said assembly has a plate member, said plate member defining a stud-hole, and said eighth coupling means has a threaded stud member, said threaded stud member being positioned such that when the support frame member is pivotal ly positioned to the second position, the stud-hole registers with and fits on to the stud member, said eighth coupling means also having a handle-wing nut member defining a threaded installation hole, the threaded installation hole of the hand-wing nut member of said eighth coupling means being threadably engaged upon the threaded stud member of the eighth coupling means to biasably and releasably secure the plate member of the sixth coupling means on to the threaded stud member of the eighth coupling means when the support frame member is in the second position.

20. A windshield protection guard and combination support surface assembly, for use on a vehicle having a windshield, a roof area, a support area adjacent to the windshield, and a hood area, said assembly comprising:

a guard and support member, having front and back sides and being generally quadrilateral in configuration, when viewed from the front and back sides;

a perimeter frame member having first and second lengthwise side members and first and second widthwise portion members, attached to one another, said perimeter frame member being attached to the guard and support member, and defining, when so attached, the substantial perimeter of said guard and support member, the first lengthwise side member having a first hinge extension member and a second hinge extension member, at either end thereof, each extending free and outboard of the guard and support member and defining an axial plane upon which each is so positioned, and the second lengthwise side member having a first end portion and a second end portion at either end thereof, proximal to the attachment, respectively, of the first and second widthwise portion members, and having a middle portion area generally, positionally between the first end portion and the second end portion of said second lengthwise side member;

a first hinge support member, being attached to the support area adjacent to the windshield of the vehicle, for mating with the first hinge extension member, said first hinge extension member being pivotally coupled and mated within the first hinge support member, and a second hinge support member, being attached to the support area adjacent to the windshield of the vehicle, and spaced from the first hinge support member, for mating with the second hinge extension member, said second hinge extension member being pivotally coupled and mated within the second hinge support member, wherein, the perimeter frame member can be pivoted such that the second lengthwise side member thereof defines and moves along an arcuate positional course, so that the guard and support member attached to the perimeter frame member defines, at different pivotal positions, a dihedral angle in reference to the windshield and the hood area of the vehicle;

a first coupling member, attached proximal and adjacent to the first end portion of the second lengthwise side member of said perimeter frame member, and substantially proximal to the arcuate positional course of the second lengthwise side member, and a second coupling member, attached proximal and adjacent to the second end portion of the second lengthwise side member of said perimeter frame member, and substantially proximal to the arcuate positional course of the second lengthwise side member;

a third coupling member, attached to the roof area of the vehicle, opposite of said first coupling member and substantially proximal to the arcuate positional course of the second lengthwise side member, for positionally mating with said first coupling member and releasable securement therewith, and a fourth coupling member, attached to the roof area of the vehicle, opposite of said second coupling member and substantially proximal to the arcuate positional course of the second lengthwise side member, for positionally mating with said second coupling member and releasable securement therewith;

a fifth coupling member, attached to the middle portion area of the second lengthwise side member of said perimeter frame member, opposite and spaced from the first coupling member and substantially proximal to the arcuate positional course of the second lengthwise side member, and a sixth coupling member, attached to the middle portion area of the second lengthwise side member of said perimeter frame member, spaced from said fifth coupling member, and opposite and spaced from the second coupling member and substantially proximal to the arcuate positional course of the second lengthwise side member; and a seventh coupling member, attached to the hood area of the vehicle, opposite of said fifth coupling member and substantially proximal to the arcuate positional course of the second lengthwise side member, for positionally mating with said fifth coupling member and releasable securement therewith, and a eighth coupling member, attached to the hood area of the vehicle, opposite of said sixth coupling member and substantially proximal to the arcuate positional course of the second lengthwise side member, for positionally mating with said sixth coupling member and releasable securement therewith;

whereby; the second lengthwise side member of the perimeter frame member can be pivotally positioned, substantially along the arcuate positional course thereof, to a first position, and secured thereat, utilizing the first, second, third, and fourth coupling members, for protecting and covering the windshield of the vehicle; and the second lengthwise side member of the perimeter frame member can be pivotally positioned, substantially along the arcuate positional course thereof, to a second position, and secured thereat, utilizing the fifth, sixth, seventh, and eighth coupling member, for covering the hood area of the vehicle and providing a support surface thereover.

* * * * *